US009438437B2

(12) United States Patent
Onoue

(10) Patent No.: US 9,438,437 B2
(45) Date of Patent: Sep. 6, 2016

(54) APPARATUS AND METHOD FOR EFFICIENTLY MULTICASTING DATA TO A PLURALITY OF DESTINATION DEVICES

(71) Applicant: FUJITSU LIMITED, Kawasaki-shi (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 13/975,800

(22) Filed: Aug. 26, 2013

(65) Prior Publication Data
US 2014/0140343 A1 May 22, 2014

(30) Foreign Application Priority Data

Nov. 22, 2012 (JP) ................................. 2012-256888

(51) Int. Cl.
*H04L 12/18* (2006.01)
(52) U.S. Cl.
CPC ....... *H04L 12/1881* (2013.01); *H04L 12/1877* (2013.01)
(58) Field of Classification Search
None
See application file for complete search history.

(56) References Cited

U.S. PATENT DOCUMENTS

| | | | | |
|---|---|---|---|---|
| 6,457,059 B1* | 9/2002 | Kobayashi | ............ | H04L 12/185 709/242 |
| 7,616,634 B2* | 11/2009 | Gotoh | ................ | H04L 12/1836 370/390 |
| 2006/0018333 A1* | 1/2006 | Windisch | ............ | H04L 12/1877 370/432 |
| 2006/0268934 A1* | 11/2006 | Shimizu | ................ | H04L 12/185 370/473 |
| 2009/0147718 A1* | 6/2009 | Liu | ..................... | H04L 12/1863 370/312 |
| 2009/0248886 A1* | 10/2009 | Tan | ..................... | H04L 12/1836 709/231 |

FOREIGN PATENT DOCUMENTS

| | | |
|---|---|---|
| JP | 2000-4251 | 1/2000 |
| JP | 2005-286681 | 10/2005 |

OTHER PUBLICATIONS

Cain, et al. "Internet Group Management Protocol, Version 3," Network Working Group, *The Internet Society*, Oct. 2002, pp. 1-53.
Christensen, et al. "Considerations for Internet Group Management Protocol (IGMP) and Multicast Listener Discovery (MLD) Snooping Switches," Network Working Group, *The Internet Society*, May 2006, pp. 1-16.
Office Action issued by the Japanese Patent Office on Jun. 21, 2016 in corresponding Japanese patent application No. 2012-256888.

* cited by examiner

*Primary Examiner* — Jae Y Lee
*Assistant Examiner* — Tito Pham
(74) *Attorney, Agent, or Firm* — Staas & Halsey LLP

(57) ABSTRACT

A transfer device stores unicast addresses in association with a multicast address, where the multicast address is used for multicasting data to a plurality of transmission destination devices each serving as a transmission destination of the data, and the unicast address is used for transmitting data from the transfer device to a transmission destination device directly connected to the transfer device. Upon receiving first data to be transmitted to the transmission destination device, when a unicast address associated with a multicast address assigned to the first data is stored in the transfer device, the transfer device generates second data by changing the multicast address assigned to the first data into a unicast address that is associated with the multicast address, and transfers the second data to one of the plurality of transmission destination devices directly connected to the transfer device.

3 Claims, 18 Drawing Sheets

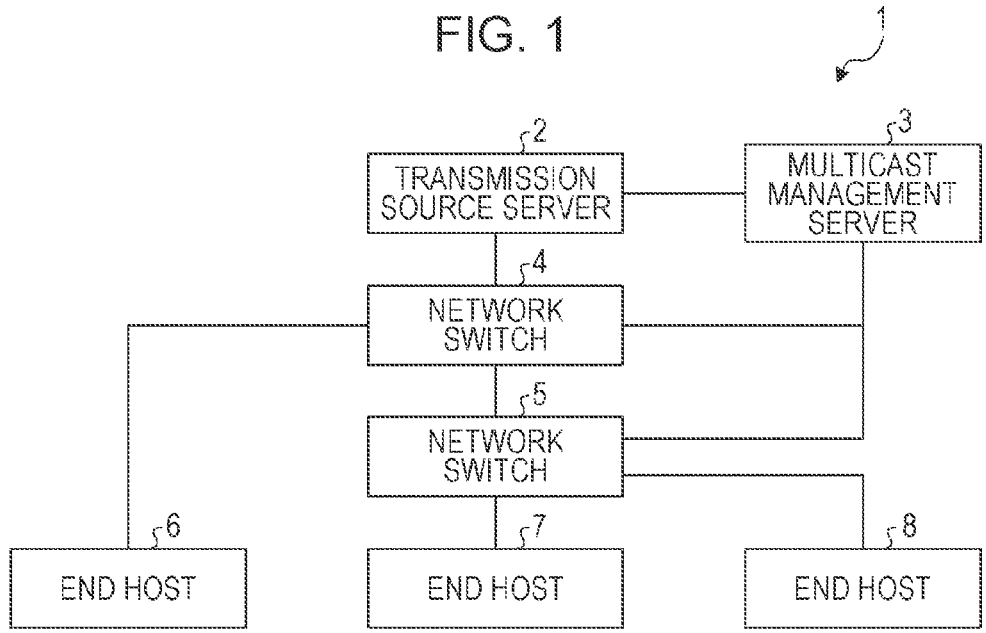
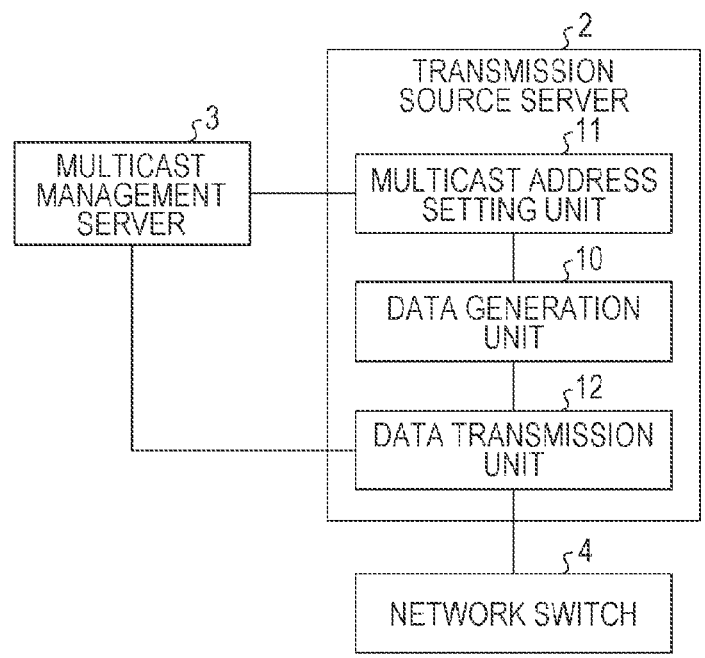

FIG. 4

| TRANSMISSION SOURCE SERVER 2 | NETWORK SWITCH 4 |
|---|---|
| NETWORK SWITCH 4 | TRANSMISSION SOURCE SERVER 2 (#4)<br>NETWORK SWITCH 5 (#3)<br>END HOST 6 (#1) |
| NETWORK SWITCH 5 | NETWORK SWITCH 4 (#1)<br>END HOST 7 (#2)<br>END HOST 8 (#3) |
| END HOST 6 | 1.1.1.1 | NETWORK SWITCH 4 |
| END HOST 7 | 2.2.2.2 | NETWORK SWITCH 5 |
| END HOST 8 | 3.3.3.3 | NETWORK SWITCH 5 |

| 24 |
|---|
| ma1: (a1, a2, a3) |
| ma2: |
| ma3: |

FIG. 7

| MULTICAST ADDRESS | PORT | UNICAST ADDRESS |
|---|---|---|
| ma1 | #1 | 1.1.1.1 |

FIG. 8

| MULTICAST ADDRESS | PORT | UNICAST ADDRESS |
|---|---|---|
| ma1 | #2 | 2.2.2.2 |
| ma1 | #3 | 3.3.3.3 |

FIG. 9

| PORT | TRANSMISSION DESTINATION ADDRESS |
|---|---|
| #1 | 1.1.1.1 |
| #2 | ma1 |
| ⋮ | ⋮ |

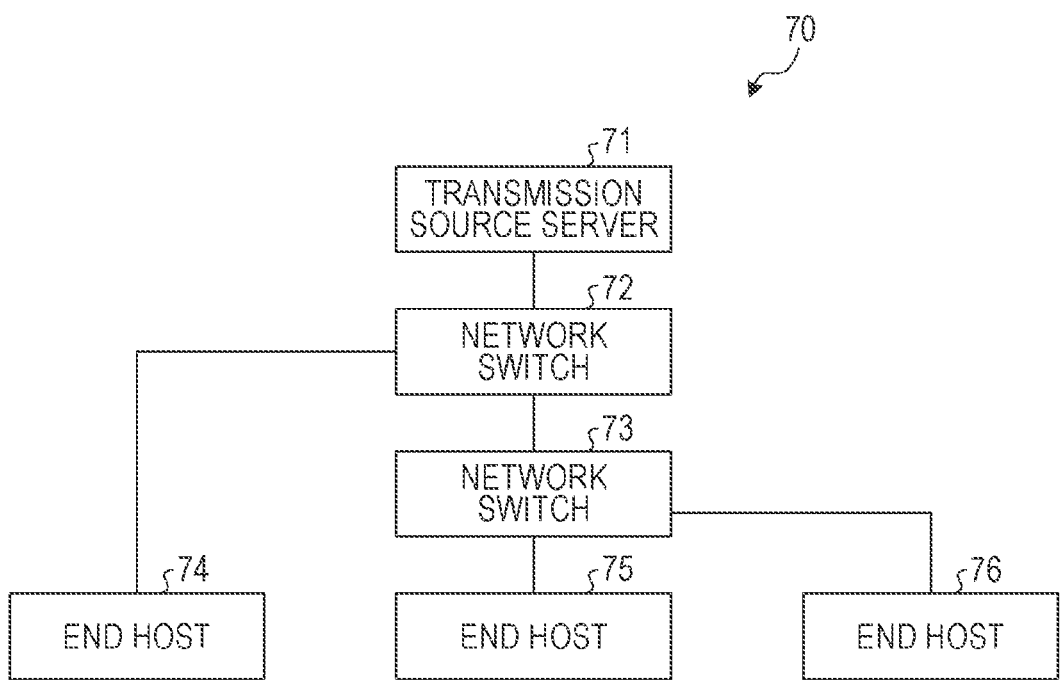

APPARATUS AND METHOD FOR EFFICIENTLY MULTICASTING DATA TO A PLURALITY OF DESTINATION DEVICES

CROSS-REFERENCE TO RELATED APPLICATION

This application is based upon and claims the benefit of priority of the prior Japanese Patent Application No. 2012-256888, filed on Nov. 22, 2012, the entire contents of which are incorporated herein by reference.

FIELD

The embodiments discussed herein are related to apparatus and method for efficiently multicasting data to a plurality of destination devices.

BACKGROUND

In the past, there has been known a technique for transmitting and receiving data through a network. For example, there has been known a storage system where data is transferred from one transmission source device to a plurality of end hosts, end hosts duplicate the received data, and hence, the reliability of data or read-write performance is improved.

FIG. 22 is a diagram illustrating an example of a storage system of the related art. In the example illustrated in FIG. 22, a storage system 70 includes a transmission source server 71, a plurality of network switches 72 and 73, and a plurality of end hosts 74 to 76. In addition, the network switch 72 is connected to the transmission source server 71, the end host 74, and the network switch 73. In addition, the network switch 73 is connected to the network switch 72, the end host 75, and the end host 76.

Here, in order to duplicate data in the individual end hosts 74 to 76, the transmission source server 71 performs the transmission of data using multi-unicast or a chain. For example, in the storage system 70, when data is transferred using the multi-unicast, data paths used for unicast are individually generated with respect to the individual end hosts 74 to 76, and data is transmitted through the individual data paths.

In detail, the transmission source server 71 generates a data path for transmitting data to the end host 74 through the network switch 72. In addition, the transmission source server 71 individually generates data paths for transmitting data to the end host 75 and the end host 76 through the network switch 72 and the network switch 73. In addition, the transmission source server 71 transfers data through the individual generated data paths.

In addition, for example, when transferring data using the chain, the transmission source server 71 transmits the data to the end host 74 through the network switch 72. Then, the end host 74 duplicates and stores therein the data, and transmits the data to the end host 75 through the network switches 72 and 73.

Upon receiving the data from the end host 74, the end host 75 duplicates and stores therein the data, and transmits the data to the end host 76 through the network switch 73. In this way, in the storage system 70, data is transferred from the transmission source server 71 to the individual end hosts 74 to 76, along a chain-like route tracking all the end hosts 74 to 76.

Here, there has been known the technique of multicast where, in order to realize efficient data transfer, data is simultaneously transferred to a specific group of transmission destination devices selected from among transmission destination devices connected to a network.

For example, when the storage system 70 transmits data using the technique of multicast, an internet group management protocol (IGMP) report is transmitted from an end host participating in a group of end hosts serving as transmission destinations of the data. Here, upon receiving the IGMP report, each of the network switches 72 and 73 registers, in a multicast table, a multicast address indicating a group serving as a transmission destination of the data, in association with information on a port having received the IGMP report.

In addition, upon receiving data to which a multicast address is assigned, each of the network switches 72 and 73 refers to the multicast table, and identifies a port associated with the multicast address assigned to the data. Thereafter, each of the network switches 72 and 73 sends out data from the identified port.

A technique of the related art has been disclosed in Japanese Laid-open Patent Publication No. 2000-004251.

A technique of the related art has also been disclosed in M. Christensen, K. Kimball, and F. Solensky, Considerations for Internet Group Management Protocol (IGMP) and Multicast Listener Discovery (MLD) Snooping Switches (RFC 4541), May 2006, or B. Cain, S. Deering, I. Kouvelas, B. Fenner, and A. Thyagarajan, Internet Management Group Protocol, Version 3 (RFC 3376), October 2002.

SUMMARY

According to an aspect of the invention, there is provided a transfer device. The transfer device stores unicast addresses in association with a multicast address, where the multicast address is used for multicasting data to a plurality of transmission destination devices each serving as a transmission destinations of the data, and the unicast address is used for transmitting data from the transfer device to a transmission destination device directly connected to the transfer device. The transfer device determines, upon receiving first data to be transmitted to the transmission destination device, whether or not a unicast address associated with a multicast address assigned to the first data is stored in the transfer device. The transfer device multicasts the first data when it is determined that the unicast address associated with the multicast address is not stored in the transfer device. When it is determined that the unicast address associated with the multicast address is stored in the transfer device, the transfer device generates second data by changing the multicast address assigned to the first data into a unicast address that is associated with the multicast address in the transfer device, and transfers the second data to one of the plurality of transmission destination devices directly connected to the transfer device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a multicast system, according to a first embodiment;

FIG. 2 is a diagram illustrating an example of a functional configuration of a transmission source server, according to a first embodiment;

FIG. 4 is a diagram illustrating an example of information stored in a network topology storage unit, according to an embodiment;

FIG. 5 is a diagram illustrating an example of information stored in a multicast address holding unit, according to an embodiment;

FIG. 7 is a diagram illustrating an example of changing information, according to an embodiment;

FIG. 8 is a diagram illustrating an example of changing information, according to an embodiment;

FIG. 9 is a diagram illustrating an example of information stored in a transfer information storage unit, according to an embodiment;

FIG. 22 is a diagram illustrating an example of a storage system of the related art.

DESCRIPTION OF EMBODIMENTS

Figure 3:
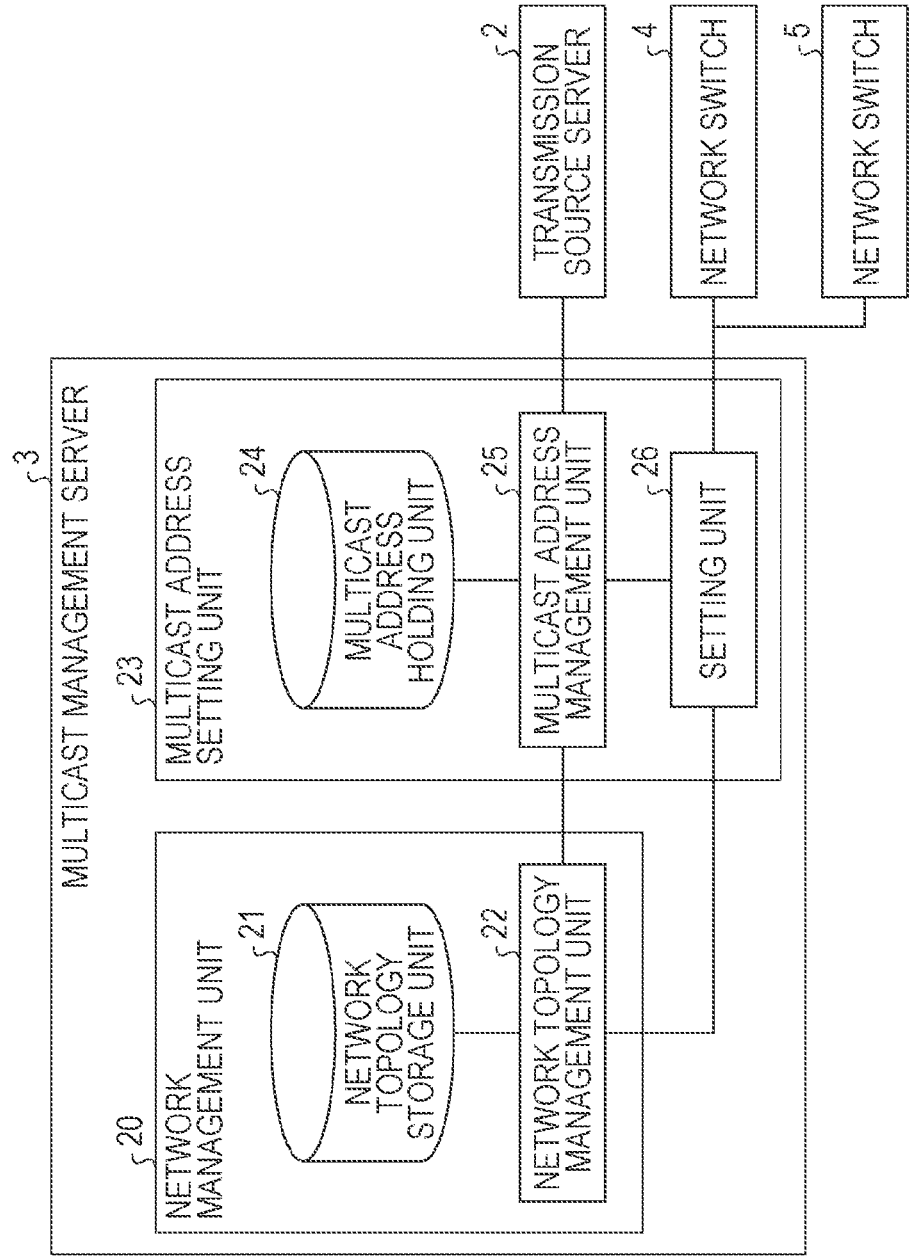
FIG. 3 is a diagram illustrating an example of a functional configuration of a multicast management server, according to a first embodiment.

In the above-mentioned technique of multicast, there is a problem that programs operating on all the end host sides are desired to be made compatible with multicast communication.

For example, in the above-mentioned technique of multicast, a program on an end host side is desired to be modified so that an end host serving as a target of multicast transmission transmits an IGMP report. In the storage system 70, when a group of end hosts to which data is to be transmitted is changed with respect to each piece of data, a multicast address is desired to be dynamically allocated every time each piece of data is transmitted.

Hereinafter, with reference to accompanying drawings, a transfer program, a setting program, a transmission program, a transfer device, a setting device, a transmission device, a transfer method, a setting method, and a transmission method will be described that are related to the present application.

[First Embodiment]

In the following first embodiment, an example of a multicast system will be described using FIG. 1. FIG. 1 is a diagram illustrating an example of a multicast system, according to a first embodiment. In the example illustrated in FIG. 1, a multicast system 1 includes a transmission source server 2, a multicast management server 3, a network switch 4, a network switch 5, and a plurality of end hosts 6 to 8, where the network switches 4 and 5 each function as a transfer device.

In FIG. 1, the three end hosts 6 to 8 are described in order to facilitate understanding. However, embodiments are not limited to this, and the multicast system 1 may also include an arbitrary number of end hosts. In the following description, an example will be described where up to two network switches 4 and 5 exist between the transmission source server 2 and the end hosts 6 to 8. However, embodiments are not limited to this, and an arbitrary number of network switches may also exist in an arbitrary number of stages. In addition, it is assumed that the network switch 5 fulfills the same function as the network switch 4, and the description thereof will be omitted.

The transmission source server 2 may be a server configured to transmit data to each of the end hosts 6 to 8, and, for example, may be an end host of a storage system storing data that is made redundant. To efficiently transmit data, the transmission source server 2 performs multicast transmission where data is collectively transmitted to a predetermined set of end hosts. For example, when multicasting data to a group including the end hosts 6 to 8, in some cases the transmission source server 2 multicasts data to a group including the end hosts 6 and 8 and not including the end host 7.

In this case, when multicasting data, the transmission source server 2 identifies an end host serving as a transmission destination, and notifies a multicast management server 3 of the identified end host. The transmission source server 2 receives, from the multicast management server 3, the notice of a multicast address used for multicasting data, namely, a multicast address indicating a group including end hosts serving as a transmission destination for the data. The transmission source server 2 assigns, to the data, the multicast address given notice of by the multicast management server 3, as the transmission destination of the data, and outputs, to the network switch 4, the data to which the multicast address is assigned.

The transmission source server 2 receives a response to the transmitted data, from the end host to which the data has been transmitted. Upon receiving responses from all the end hosts to which the data has been transmitted, the transmission source server 2 transmits, to the multicast management server 3, a notice to the effect that the multicast transmission has finished. When not having received a response during a predetermined time having elapsed after transmitting the data, the transmission source server 2 unicasts the data only to an end host from which no response has been received.

The multicast management server 3 manages the multicast address that is used by the transmission source server 2 when multicasting data. Specifically, upon receiving, from the transmission source server 2, a notice of a group of end hosts serving as a transmission destination of data, the multicast management server 3 identifies an unused multicast address. The multicast management server 3 identifies a network switch that transfers the data to the group of end hosts that has been notified of. In other words, when multicasting the data to the group of end hosts, the multicast management server 3 identifies a path for transferring the data, and identifies network switches positioned on the identified path.

The multicast management server 3 specifies, from among the identified network switches, a network switch directly connected to one of the group of end hosts serving as the transmission destination for the data. The multicast management server 3 sets the specified network switch so that transfer of data is performed after the identified multicast address is changed to a unicast address. For example, the multicast management server 3 notifies the specified network switch of a pair of the identified multicast address and a unicast address that is to be used when the data is transmitted to only the end host directly connected to the specified network switch.

The multicast management server 3 identifies, from among network switches included in the path through which data is transferred, a network switch that transfers the data to another network switch. Then, the multicast management server 3 notifies the identified network switch of a multicast address to be assigned to the data and the output destination of the data so that the identified network switch transfers the data.

Thereafter, the multicast management server 3 notifies the transmission source server 2 of the identified multicast address. In the case, the multicast management server 3 manages the fact that the multicast address notified to the transmission source server 2 is in use, and upon receiving from the transmission source server 2 a notice to the effect that the multicast transmission has finished, the multicast management server 3 manages the fact that the corresponding multicast address is not in use.

For example, the multicast management server 3 receives, from the transmission source server 2, information on the end hosts 6 to 8. Then, the multicast management server 3 identifies an unused multicast address, "ma1". In addition, the multicast management server 3 determines that the network switches 4 and 5 are included in paths along via which data is transferred from the transmission source server 2 to the end hosts 6 to 8. Then, the multicast management server 3 determines that the network switch 4 is directly connected to the end host 6 and the end hosts 7 and 8 are directly connected to the network switch 5. In addition, the multicast management server 3 determines that the network switch 4 transfers data to be multicast, to the network switch 5.

In such a case, upon receiving data to which the "ma1" is assigned, the multicast management server 3 sets the network switch 4 to change the "ma1" to the unicast address of the end host 6 and transmit the data to the end host 6. In addition, the multicast management server 3 sets the network switch 4 to transmit, to the network switch 5, the data to which the "ma1" is assigned.

Upon receiving data to which the "ma1" is assigned, the multicast management server 3 sets the network switch 5 to change the "ma1" to the unicast address of the end host 7 and transmit the data to the end host 7. In addition, the multicast management server 3 sets the network switch 5 to change the "ma1" to the unicast address of the end host 8 and transmit the data to the end host 8. Thereafter, the multicast management server 3 notifies the transmission source server 2 of the multicast address, "ma1".

The network switch 4 is a network switch configured to transfer data. The network switch 4 transfers data in accordance with the setting from the multicast management server 3. For example, upon receiving from the multicast management server 3 a notice of the multicast address "ma1" and the unicast address of the end host 6, the network switch 4 stores therein the "ma1" in association with the unicast address of the end host 6.

Upon receiving data to which the multicast address "ma1" is assigned, the network switch 4 changes the multicast address "ma1" to the unicast address of the end host 6. After that, the network switch 4 transfers, to the end host 6, the data in which the multicast address is changed to the unicast address.

When the multicast management server 3 has set the network switch 4 to transmit, to the network switch 5, the data to which the "ma1" is assigned, the network switch 4 transfers the data, in parallel with the above-mentioned processing for changing the multicast address. In other words, the network switch 4 transmits the data to which the "ma1" is assigned, to the network switch 5, without changing the data.

The end hosts 6 to 8 are end hosts serving as transmission destinations of data, and, for example, end hosts implemented in a storage system. In addition, upon receiving data from the network switches 4 and 5, the end hosts 6 to 8 transmit, to the transmission source server 2, responses indicating the fact that the data has been normally received. In this case, each of the network switches 4 and 5 transmits a response to the transmission source server 2.

Next, with reference to FIG. 2, a functional configuration of the transmission source server 2 will be described. FIG. 2 is a diagram illustrating an example of a functional configuration of a transmission source server, according to a first embodiment. As illustrated in FIG. 2, the transmission source server 2 includes a data generation unit 10, a multicast address setting unit 11, and a data transmission unit 12. The data generation unit 10 generates data to be transmitted, and identifies an end host serving as a transmission destination of the data.

When the transmission destination of the data is one end host, the data generation unit 10 outputs, to the data transmission unit 12, the unicast address of the end host serving as a transmission destination of the data and the data to be transmitted. When there exist a plurality of end hosts serving as transmission destinations of the data, the data generation unit 10 outputs, to the data transmission unit 12, the data to be transmitted, and notifies the multicast address setting unit 11 of the identified end hosts.

Upon receiving, from the data generation unit 10, information on an end host serving as a transmission destination of data, the multicast address setting unit 11 notifies the multicast management server 3 of the received information on the end host. In such a case, the multicast management server 3 notifies the transmission source server 2 of an unused multicast address.

Upon receiving, from the data generation unit 10, a unicast address and data to be transmitted, the data transmission unit 12 transmits the data to the network switch 4 by defining the received unicast address as a transmission destination address thereof. In addition, upon receiving data to be transmitted from the data generation unit 10 and receiving a notice of a multicast address from the multicast management server 3, the data transmission unit 12 executes the following processing. That is, the data transmission unit 12 defines, as a transmission destination address, the multicast address notified of by the multicast management server 3, and outputs the data to the network switch 4.

When responses have been received during a predetermined time period from outputting the data to the network switch 4, from not all the end hosts serving as the transmission destinations of the data, the data transmission unit 12 performs retransmission processing for the data, using a unicast address. Specifically, the data transmission unit 12 assigns, to data to be retransmitted, the unicast address of an end host from which no response has been received, and outputs the data to the network switch 4.

Next, with reference to FIG. 3, a functional configuration of the multicast management server 3 will be described. FIG. 3 is a diagram illustrating an example of a functional configuration of a multicast management server, according to a first embodiment. As illustrated in FIG. 3, the multicast management server 3 includes a network management unit 20 and a multicast address setting unit 23. The network management unit 20 includes a network topology storage unit 21 and a network topology management unit 22. The multicast address setting unit 23 includes a multicast address holding unit 24, a multicast address management unit 25, and a setting unit 26.

The network topology storage unit 21 stores therein a connection relationship between the transmission source server 2, the individual network switches 4 and 5, and the end hosts 6 to 8, which are included in the multicast system 1. FIG. 4 is a diagram illustrating an example of information stored in a network topology storage unit, according to an embodiment. As illustrated in FIG. 4, the network topology storage unit 21 stores therein the names of individual devices included in the multicast system 1 and the names of the other devices directly connected to the individual devices, in association with each other.

As illustrated in FIG. 4, the network topology storage unit 21 stores therein unicast addresses used when data is unicast to the individual end hosts 6 to 8. In addition, as illustrated in FIG. 4, the network topology storage unit 21 stores information on a port of the network switch 4 or 5, via which the network switch 4 or 5 is connected to another device.

In the example illustrated in FIG. 4, the network topology storage unit 21 stores therein information indicating that the network switch 4 is connected to the transmission source server 2. In addition, the network topology storage unit 21 stores therein information indicating that the transmission source server 2 is connected to port "#4" of the network switch 4, the network switch 5 is connected to port "#3" of the network switch 4, and the end host 6 is connected to port "#1" of the network switch 4.

In FIG. 4, the network topology storage unit 21 stores therein information indicating that the network switch 4 is connected to port "#1" of the network switch 5, the end host 7 is connected to port "#2" of the network switch 5, and the end host 8 is connected port "#3" of the network switch 5. In addition, the network topology storage unit 21 stores therein information indicating that the end host 6 is connected to the network switch 4, the end host 7 is connected to the network switch 5, and the end host 8 is connected to the network switch 5.

In the example illustrated in FIG. 4, the network topology storage unit 21 stores therein information indicating that the unicast address of the end host 6 is "1.1.1.1", the unicast address of the end host 7 is "2.2.2.2", and the unicast address of the end host 8 is "3.3.3.3".

In the example illustrated in FIG. 4, the name of each device included in the multicast system 1 is described so as to facilitate understanding, an embodiment is not limited to this, and the network topology storage unit 21 may also store therein arbitrary identification information used for identifying each device.

Referring back to FIG. 3, the multicast address holding unit 24 stores therein the usage state of a multicast address. FIG. 5 is a diagram illustrating an example of information stored in a multicast address holding unit, according to an embodiment. As illustrated in FIG. 5, the multicast address holding unit 24 stores therein a multicast address and an identifier for identifying an end host serving as the transmission destination of data to which the multicast address is assigned, in association with each other.

For example, in the example illustrated in FIG. 5, the "ma1" is stored in association with "a1", "a2", and "a3", where the "a1" is an identifier identifying the end host 6, the "a2" is an identifier identifying the end host 7, and the "a3" is an identifier identifying the end host 8.

In such a case, the multicast system 1 multicasts, to the end hosts 6 to 8, data to which the "ma1" is assigned. In addition, in the example illustrated in FIG. 5, "ma2" and "ma3" are stored without being associated with an identifier identifying an end host. Therefore, the multicast management server 3 determines that the "ma2" and the "ma3" are unused multicast addresses.

Referring back to FIG. 3, upon receiving, from the multicast address management unit 25, a notice of an end host serving as the transmission destination of data, the network topology management unit 22 identifies a network switch to transfer the data, using information stored in the network topology storage unit 21. Further, from among identified network switches, the network topology management unit 22 identifies a network switch directly connected to the end host serving as the transmission destination of data and a network switch to transfer the data to another network switch.

As for the network switch directly connected to the end host serving as the transmission destination of data, the network topology management unit 22 identifies a port to which the end host serving as the transmission destination of data is connected. Further, as for the network switch to transfer the data to another network switch, the network topology management unit 22 identifies a port to which the another network switch is connected.

Then, the network topology management unit 22 notifies the setting unit 26 of information on a network switch directly connected to the end host serving as the transmission destination of data and a port to which the end host serving as the transmission destination of data is connected. Further, the network topology management unit 22 notifies the setting unit 26 of the unicast address of the end host serving as the transmission destination of data. In addition, the network topology management unit 22 notifies the setting unit 26 of information on a network switch to transfer the data to the other network switch and a port to which the other network switch is connected.

Upon receiving, from the transmission source server 2, a notice of a plurality of end nodes serving as the transmission destinations of data, the multicast address management unit 25 transmits an unused multicast address to the transmission source server 2. In this case, the multicast address management unit 25 accesses the multicast address holding unit 24, and identifies an unused multicast address. Then, the multicast address management unit 25 stores, in the multicast address holding unit 24, the plurality of end hosts notified of from the transmission source server 2 and the unused multicast address, in association with each other.

Next, the multicast address management unit 25 notifies the network topology management unit 22 and the setting unit 26 of the end hosts notified of from the transmission source server 2. After that, upon receiving, from the setting unit 26, a notice to the effect that the settings of network switches have finished, the multicast address management unit 25 transmits, to the transmission source server 2, the multicast address associated with the plurality of end hosts notified of from the transmission source server 2.

Upon receiving, from the transmission source server 2, a notice to the effect that the multicast transmission of the data has been completed, the multicast address management unit 25 puts the multicast address used for the completed multicast transmission, into an unused multicast address. In detail, the multicast address management unit 25 deletes identifiers identifying the end hosts associated with the multicast address used for the completed multicast communication, from among multicast addresses held in the multicast address holding unit 24. In addition, the multicast address management unit 25 notifies the setting unit 26 of the multicast address used for the completed multicast communication.

When each of the network switches 4 and 5 transfers the multicast data to a directly connected end host, the setting unit 26 sets the network switches 4 and 5 so that data is transferred after the multicast address is changed into a unicast address.

Specifically, the setting unit 26 receives, from the network topology management unit 22, a notice of a network switch directly connected to an end host serving as the transmission destination of data and a port to which the end host serving as the transmission destination of data is connected. In addition, the setting unit 26 receives, from the network topology management unit 22, a notice of the unicast address of the end host directly connected to the network switch. Further, the setting unit 26 receives a notice of a multicast address from the multicast address management unit 25.

Then, the setting unit 26 executes the following processing with respect to each network switch directly connected to an end host serving as the transmission destination of data. First, the setting unit 26 generates changing information storing the multicast address notified of from the multicast address management unit 25, information on a port to which the end host serving as the transmission destination of data is directly connected, and the unicast address of the directly connected end host, in association with each other. The setting unit 26 transmits the generated changing information to the network switch.

For example, when the end host 6 is included in the transmission destinations of data to which the multicast address, "ma1", is assigned, the setting unit 26 receives, from the network topology management unit 22, a notice of the network switch 4 directly connected to the end host 6. The setting unit 26 also receives, from the network topology management unit 22, a notice of the port number "#1" identifying a port to which the end host 6 is connected and the unicast address "1.1.1.1" of the end host 6. In addition, the setting unit 26 receives a notice of the multicast address "ma1" from the multicast address management unit 25.

In such a case, the setting unit 26 generates changing information storing the multicast address "ma1", the port number "#1", and the unicast address "1.1.1.1" of the end host 6 in association with each other. Then, the setting unit 26 transmits the generated changing information to the network switch 4.

The setting unit 26 receives, from the network topology management unit 22, a notice of a network switch to transfer data to another network switch and a port to which the another network switch is connected. In such a case, with respect to each network switch to transfer data to another network switch, the setting unit 26 generates and transmits transfer information that stores information on a port to which the another network switch is connected, in association with a multicast address.

For example, when the end host 7 or the end host 8 is included in the transmission destinations of the data to which the multicast address "ma1" is assigned, the network switch 4 transfers the data to the network switch 5. Therefore, the setting unit 26 receives, from the network topology management unit 22, a notice of the network switch 4 and the port number "#3" to which the network switch 5 is connected. In such a case, the setting unit 26 generates transfer information in which the multicast address "ma1" and the port number "#3" are associated with each other, and transmits the generated transfer information to the network switch 4.

When the settings of the network switch to which the end host serving as the transmission destination of the data is directly connected and the network switch to transfer the data to the other network switch have finished, the setting unit 26 determines that the settings of network switches have finished. Then, the setting unit 26 notifies the multicast address management unit 25 of information indicating that the settings of network switches have finished.

Upon receiving, from the multicast address management unit 25, a notice of the multicast address used for the completed multicast transmission, the setting unit 26 executes the following processing. That is, the setting unit 26 transmits, to each of the network switches 4 and 5, a request for deletion of the changing information and the transfer information which include the multicast address used for the completed multicast transmission.

Figure 6:
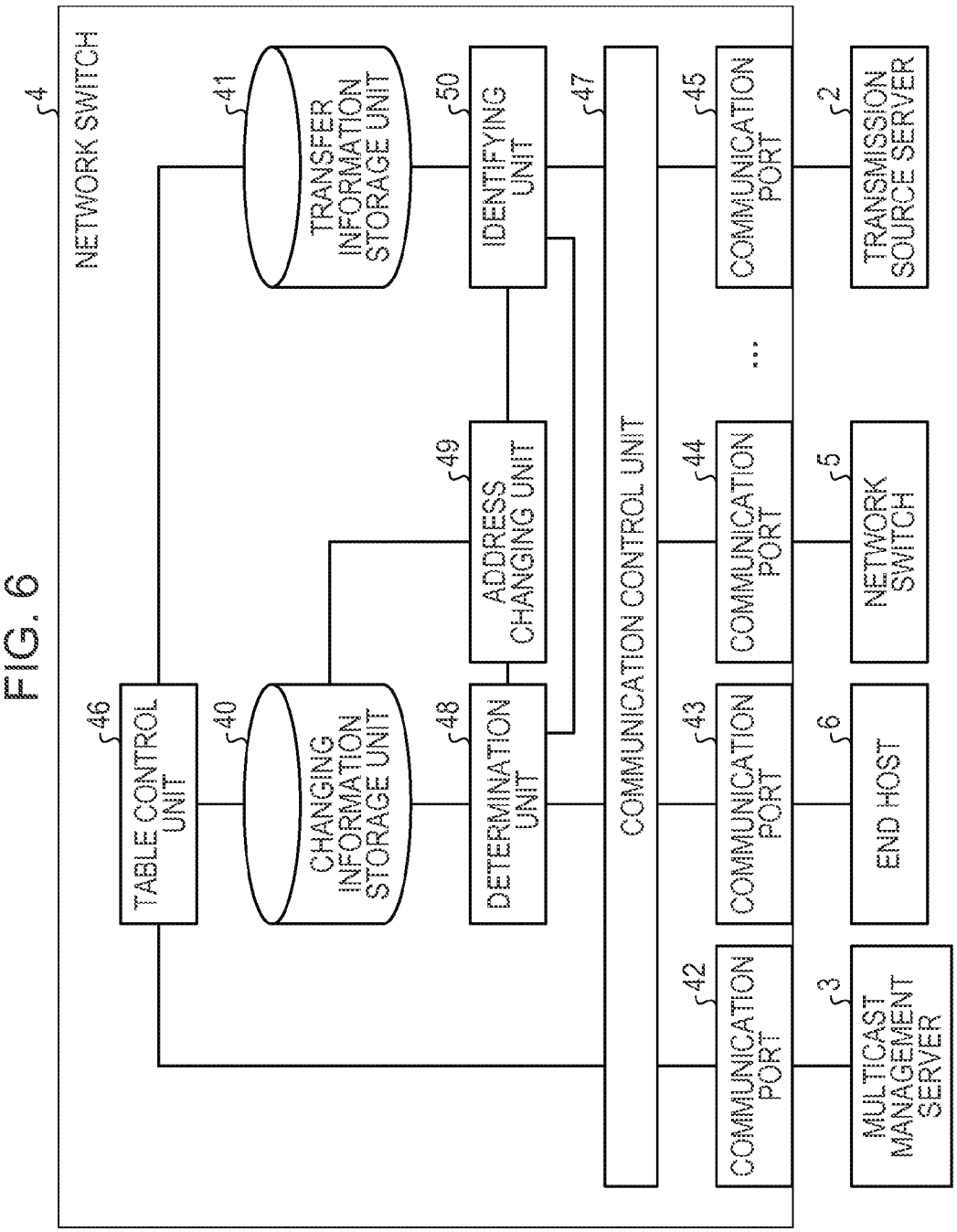
FIG. 6 is a diagram illustrating an example of a functional configuration of a network switch, according to a first embodiment.

Next, with reference to FIG. 6, a functional configuration of the network switch 4 will be described. FIG. 6 is a diagram illustrating an example of a functional configuration of a network switch, according to a first embodiment. In the example illustrated in FIG. 6, the network switch 4 includes a changing information storage unit 40, a transfer information storage unit 41, communication ports 42 to 45, a table control unit 46, a communication control unit 47, a determination unit 48, an address changing unit 49, and an identifying unit 50.

In FIG. 6, the communication port 42 is a communication port having the port number of "#0", and connected to the multicast management server 3; the communication port 43 is a communication port having the port number of "#1", and connected to the end host 6; the communication port 44 is a communication port having the port number of "#2", and connected to the network switch 5; and the communication port 45 is a communication port having the port number of "#4", and connected to the transmission source server 2. In the example illustrated in FIG. 4, although the four communication ports 42 to 45 are described, embodiments are not limited to this, and the network switch 4 may also include an arbitrary number of communication ports.

In the case where multicast data is transmitted from the network switch 4 to an end host directly connected to the network switch 4, the changing information storage unit 40 stores therein changing information used for changing a multicast address into a unicast address. For example, the changing information storage unit 40 stores therein changing information exemplified in FIG. 7.

FIG. 7 is a diagram illustrating an example of changing information, according to an embodiment. As illustrated in FIG. 7, the changing information storage unit 40 stores therein changing information in which a multicast address, information on a port, and a unicast address are stored in association with each other. For example, the changing information storage unit 40 stores therein the multicast address "ma1", the port number "#1", and the unicast address "1.1.1.1", in association with each other.

Changing information stored in the changing information storage unit 40 is different for each network switch. For example, when, in the network switch 5, the end host 7 is connected to a port "#2" and the end host 8 is connected to the port having the port number of "#3", the network switch 5 stores therein changing information as illustrated in FIG. 8.

FIG. 8 is a diagram illustrating an example of changing information, according to an embodiment. As illustrated in FIG. 8, the network switch 5 stores therein the multicast address "ma1", the port number "#2", and the unicast address "2.2.2.2", in association with each other. In addition, the network switch 5 stores therein the multicast address "ma1", the port number "#3", and the unicast address "3.3.3.3", in association with each other.

Referring back to FIG. 6, the transfer information storage unit 41 stores therein transfer information used when the network switch 4 performs transfer processing for data. FIG. 9 is a diagram illustrating an example of information stored in a transfer information storage unit, according to an embodiment. As illustrated in FIG. 9, the transfer information storage unit 41 stores therein transfer information in which a transmission destination address included in the data and the port number of a communication port to which the destination of data is connected are stored in association with each other. Here, while, in the example illustrated in FIG. 9, as a transmission destination address, the transmission destination address of data is described, the transmission destination address may be, for example, a multicast address or a unicast address.

For example, the transfer information storage unit 41 stores therein the port number "#1" and the transmission destination address "1.1.1.1", in association with each other. Therefore, upon receiving data whose transmission destination address is "1.1.1.1", the transfer information storage unit 41 outputs the received data from the communication port 43 having the port number of "#1".

In addition, the transfer information storage unit 41 stores therein the port number "#2" and the multicast address "ma1", in association with each other. Therefore, upon receiving data to which the multicast address "ma1" is assigned, the transfer information storage unit 41 outputs the received data from the communication port 44 having the port number of "#2".

Referring back to FIG. 6, the table control unit 46 reflects the setting performed by the multicast management server 3, in the changing information storage unit 40 and the transfer information storage unit 41. Specifically, through the communication control unit 47, the table control unit 46 acquires changing information that has been transmitted by the multicast management server 3. In this case, the table control unit 46 stores the received changing information, in the changing information storage unit 40.

The table control unit 46 receives transfer information that has been transmitted by the multicast management server 3, through the communication control unit 47. In this case, the table control unit 46 stores the received transfer information in the transfer information storage unit 41.

The table control unit 46 receives a request for deletion of the changing information and the transfer information that have been transmitted by the multicast management server 3, through the communication control unit 47. In this case, the table control unit 46 identifies a multicast address included in the deletion request. Then, from among pieces of changing information stored in the changing information storage unit 40, the table control unit 46 deletes changing information including the identified multicast address. In addition, from among pieces of changing information stored in the transfer information storage unit 41, the table control unit 46 deletes transfer information including the identified multicast address.

The communication control unit 47 controls communication performed by the network switch 4. For example, through the communication port 42, the communication control unit 47 outputs, to the table control unit 46, data received from the multicast management server 3. Upon receiving data to be transmitted, through the communication ports 43 to 45, the communication control unit 47 outputs the received data to the determination unit 48. In addition, upon receiving, from the identifying unit 50, data to be transmitted and the port number of a communication port to output the data, the communication control unit 47 outputs the data from the communication port identified by the received port number.

Upon receiving, from the communication control unit 47, data to be transmitted, the determination unit 48 extracts the transmission destination address of the data. Then, the determination unit 48 determines whether or not the extracted transmission destination address is stored in the changing information storage unit 40. In other words, the determination unit 48 determines whether data to be transmitted is multicast data whose transmission destinations are a plurality of end hosts including the end host 6 directly connected to the network switch 4.

When the extracted transmission destination address is stored in the changing information storage unit 40, the determination unit 48 outputs the received data to both the address changing unit 49 and the identifying unit 50. On the other hand, when the extracted transmission destination address is not stored in the changing information storage unit 40, the determination unit 48 outputs the received data only to the identifying unit 50.

For example, when the transmission destination address is the "ma1" in a state where the changing information storage unit 40 stores therein the information as illustrated in FIG. 7, the determination unit 48 outputs data to both the address changing unit 49 and the identifying unit 50. Meanwhile, when the transmission destination address is the "ma2" or the "1.1.1.1", the determination unit 48 outputs data only to the identifying unit 50.

The address changing unit 49 changes a multicast address that has been assigned, as a transmission destination address, to data received from the determination unit 48, into a unicast address. Specifically, upon receiving data from the determination unit 48, the address changing unit 49 identifies a multicast address that has been assigned to the data as a transmission destination address. In addition, the address changing unit 49 reads, from the changing information storage unit 40, a unicast address associated with the identified multicast address. Then, the address changing unit 49 changes the multicast address assigned to the data as a transmission destination address, into the unicast address read from the changing information storage unit 40, and the address changing unit 49 outputs, to the identifying unit 50, the data whose transmission destination address has been changed.

For example, when the transmission destination address is the "ma1", the address changing unit 49 reads the unicast address "1.1.1.1" that is stored in association with the "ma1" in the changing information storage unit 40. Then, the address changing unit 49 outputs the data whose transmission destination address has been changed to the "1.1.1.1", to the identifying unit 50.

The identifying unit 50 identifies a communication port via which the received data is to be output. Specifically, upon receiving data from the determination unit 48 and the address changing unit 49, the identifying unit 50 extracts a transmission destination address of the received data, and identifies, from the transfer information storage unit 41, a port number associated with the extracted transmission destination address. Then, the identifying unit 50 instructs the communication control unit 47 to output data from a communication port having the identified port number.

For example, the identifying unit 50 receives, from the determination unit 48, data whose transmission destination address is the "ma1". In this case, from the transfer information storage unit 41, the identifying unit 50 identifies the port number "#2" associated with the "ma1". Then, the identifying unit 50 instructs the communication control unit 47 to output the data received from the determination unit 48, from the communication port 44 having the port number of "#2".

The identifying unit 50 receives, from the address changing unit 49, data whose transmission destination address is the "1.1.1.1". In such a case, the identifying unit 50 identifies the port number "#1" associated with the "1.1.1.1" from the transfer information storage unit 41. Then, the identifying unit 50 instructs the communication control unit 47 to output the data received from the address changing unit 49, from the communication port 43 having the port number of "#1".

As mentioned above, the identifying unit 50 performs the transfer of data using the transfer information. However, an embodiment is not limited to this, and, for example, data transfer processing utilizing a forwarding database (FDB) may also be performed. When the identifying unit 50 performs data transfer utilizing the FDB in this way, the multicast management server 3 transmits, to the network switches 4 and 5, information to be registered in the FDB, as transfer information. In addition, every time transmission processing for data is performed, the identifying unit 50 may also learn the transmission source MAC address of the data and the sending destination port of the data, and store the learned content in the transfer information storage unit 41.

Next, with reference to FIGS. 10 to 12, the flow of processing executed by the multicast system 1 will be described. First, with reference to FIG. 10, processing will be described where the multicast management server 3 performs the setting of the changing information for each of the network switches 4 and 5.

Figure 10:
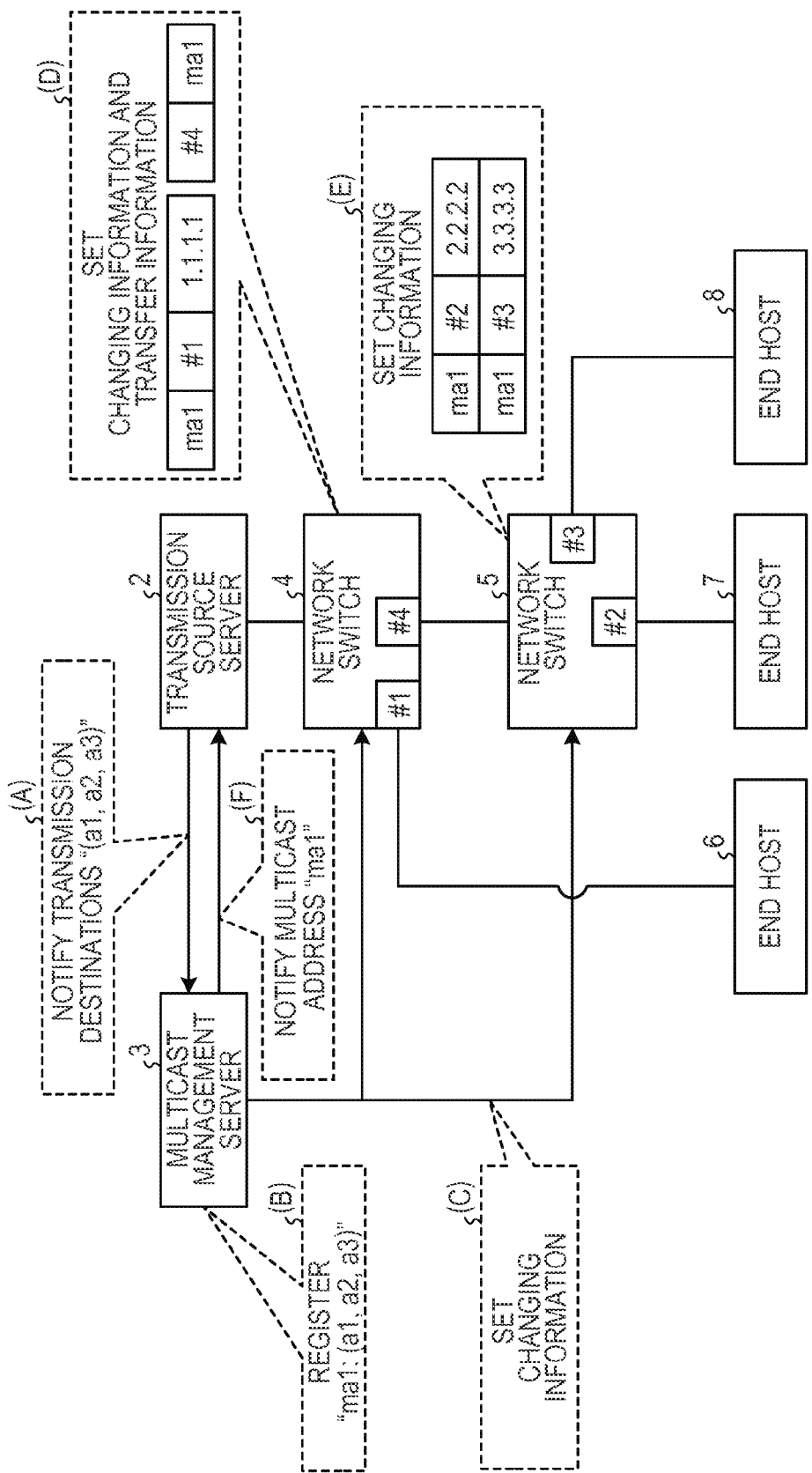
FIG. 10 is a diagram illustrating an example of an operational procedure for setting changing information, according to an embodiment.

FIG. 10 is a diagram illustrating an example of an operational procedure for setting changing information, according to an embodiment. In FIG. 10, an example is described where the end host 6 is connected to the port #1 of the network switch 4, the end host 7 is connected to the port #2 of the network switch 5, and the end host 8 is connected to the port #3 of the network switch 5.

First, as illustrated in (A) of FIG. 10, the transmission source server 2 notifies the multicast management server 3 of the identifiers "(a1, a2, a3)" for the end hosts 6 to 8 serving as transmission destinations. Then, as illustrated in (B) of FIG. 10, the multicast management server 3 stores therein a unused multicast address "ma1" and the identifiers "(a1, a2, a3)" for the end hosts 6 to 8 serving as transmission destinations in association with each other.

Next, as illustrated in (C) of FIG. 10, the multicast management server 3 performs the setting of changing information. Specifically, the multicast management server 3 recognizes the fact that the end host 6 is directly connected to the port #1 of the network switch 4 and the end host 7 is directly connected to the port #2 of the network switch 5. In addition, the multicast management server 3 recognizes the fact that the end host 8 is directly connected to the port #3 of the network switch 5 and the network switch 5 is connected to the port #4 of the network switch 4.

In this case, as illustrated in (D) of FIG. 10, the multicast management server 3 sets, in the network switch 4, changing information where the multicast address "ma1", a port "#1", and the unicast address "1.1.1.1" are associated with one another. In addition, the multicast management server 3 sets, in the network switch 4, transfer information where the multicast address "ma1" and a port "#4" are associated with each other.

As illustrated in (E) of FIG. 10, the multicast management server 3 sets, in the network switch 5, changing information where the multicast address "ma1", the port "#2", and the unicast address, "2.2.2.2" are associated with one another. In addition, the multicast management server 3 sets, in the network switch 5, changing information where the multicast address "ma1", a port "#3", and the unicast address, "3.3.3.3" are associated with one another. In addition, as illustrated in (F) of FIG. 10, the multicast management server 3 notifies the transmission source server 2 of the multicast address "ma1".

Next, with reference to FIG. 11, the flow of processing will be described where the network switches 4 and 5 change a multicast address into unicast addresses at the time of multicast transmission. FIG. 11 is a diagram illustrating an example of an operational procedure in which a network switch changes a multicast address into a unicast address, according to an embodiment. In FIG. 11, an example is described where the transmission source server 2 transmits data whose transmission destination address is set at the multicast address "ma1", after the setting of the changing information illustrated in FIG. 10 has been performed.

Figure 11:
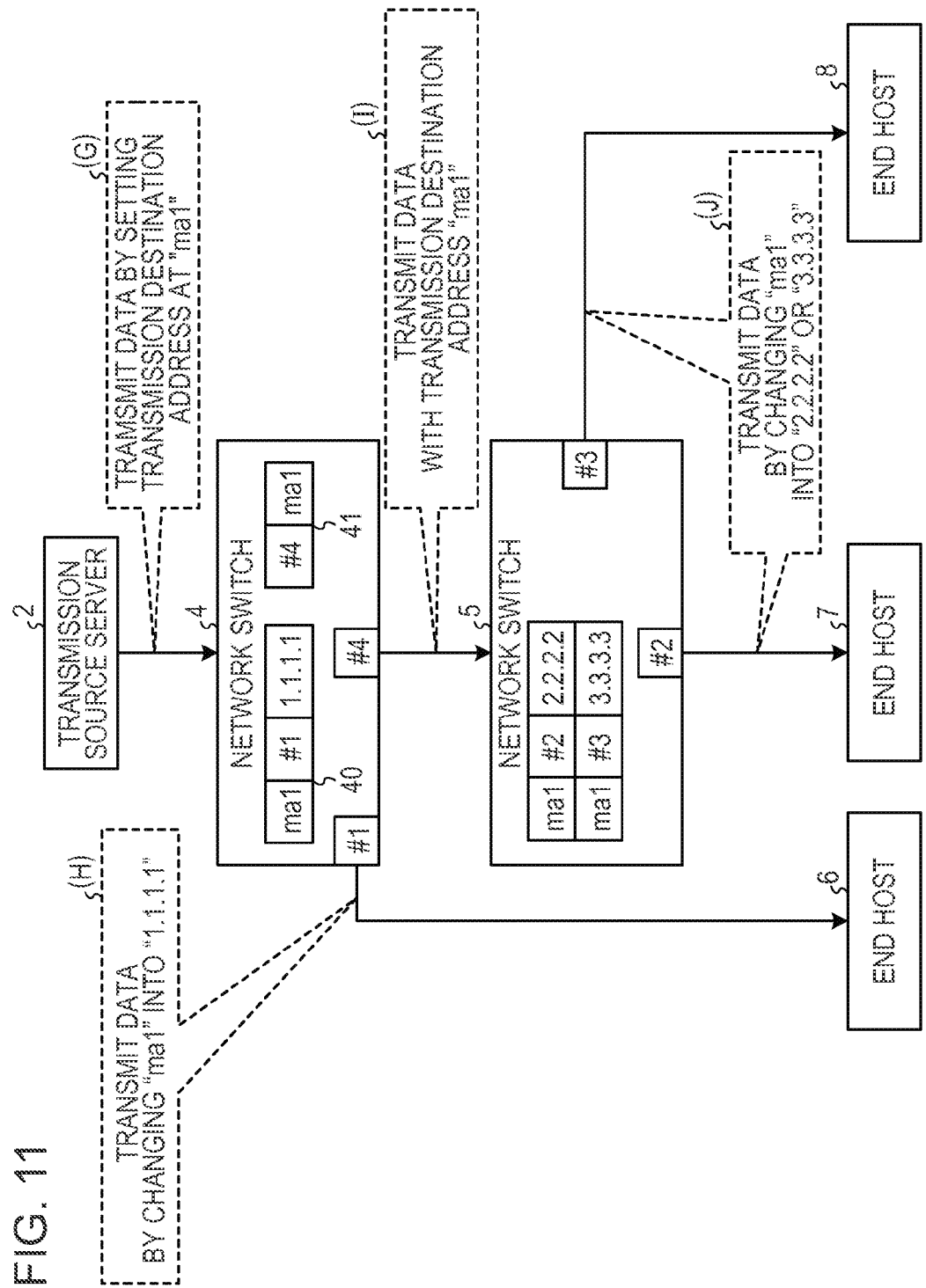
FIG. 11 is a diagram illustrating an example of an operational procedure in which a network switch changes a multicast address into a unicast address, according to an embodiment.

First, as illustrated in (G) of FIG. 11, the transmission source server 2 sets the transmission destination address at the "ma1", and transmits data to the network switch 4. Here, in the network switch 4, the changing information is set where the multicast address "ma1", the port "#1", and the unicast address "1.1.1.1" are associated with one another. Therefore, the network switch 4 changes the transmission destination address "ma1" of the data received from the transmission source server 2 into the unicast address "1.1.1.1", and outputs the data from the port "#1". In other words, the network switch 4 changes the transmission destination address of the data, from the multicast address to the unicast address of the end host 6, and transmits, to the end host 6, the data whose transmission destination address has been changed.

In the network switch 4, the transfer information is set where the multicast address "ma1" and the port "#4" are associated with each other. Therefore, the network switch 4 outputs the data received from the transmission source server 2, from the port "#4" without changing the transmission destination address thereof. In other words, the network switch 4 transmits, to the network switch 5, the data whose transmission destination address is the "ma1", without change.

Next, the network switch 5 receives, from the network switch 4, the data whose transmission destination address is the "ma1". Here, in the network switch 5, the changing information is set where the multicast address "ma1", the port "#2", and the unicast addresses "2.2.2.2" are associated with one another. Therefore, the network switch 5 changes the transmission destination address "ma1" into the unicast address "2.2.2.2", and outputs the data from the port "#2". In other words, the network switch 5 changes the transmission destination address of the data, from the multicast address to the unicast address of the end host 7, and transmits, to the end host 7, the data whose transmission destination address has been changed.

In addition, in the network switch 5, the changing information is set where the multicast address "ma1", the port "#3", and the unicast address, "3.3.3.3" are associated with one another. Therefore, the network switch 5 changes the transmission destination address "ma1" into the unicast address "3.3.3.3", and outputs the data from the port "#3". In other words, the network switch 5 changes the transmission destination address of the data, from the multicast address to the unicast address of the end host 8, and transmits, to the end host 8, the data whose transmission destination address has been changed.

In this way, when the end host 6 directly connected to the network switch 4 is included in the transmission destination of the multicast transmission, the network switch 4 changes the multicast address to the unicast address of the end host 6. In addition, the network switch 4 transmits, to the end host 6, the data whose multicast address has been changed into the unicast address. In the same way, the network switch 5 also changes the multicast address to the unicast address of the directly connected end host 7 or end host 8, and transmits the data. Therefore, the multicast system 1 may perform multicast communication without performing modifications on the end hosts 6 to 8 for the multicast communication.

In the multicast system 1, the multicast management server 3 identifies network switches to transfer data to end hosts serving as transmission destinations. Thereafter, from among identified network switches, the multicast system 1 specifies a network switch directly connected to an end host serving as a transmission destination of data. Then, the multicast system 1 sets the specified network switch so that the multicast address is changed into the unicast address of the directly connected end host. Therefore, in response to processing of the transmission source server 2 transmitting data, the multicast system 1 may dynamically set the multicast address.

In some cases, data transmission may be performed by utilizing a chain. Here, the chain is a transmission path where the transmission destination devices of duplicated data are strung together like beads, and when data is transmitted using the chain, each transmission destination device sequentially transfers data so that the data tracks a predetermined transmission path, and each transmission destination device holds the data each time the data is transferred. In order to change data transmission utilizing the chain into unicast transmission, the network switches 4 and 5 may change the transmission destination address of data, and may also change information on the chain included in the data.

Figure 12:
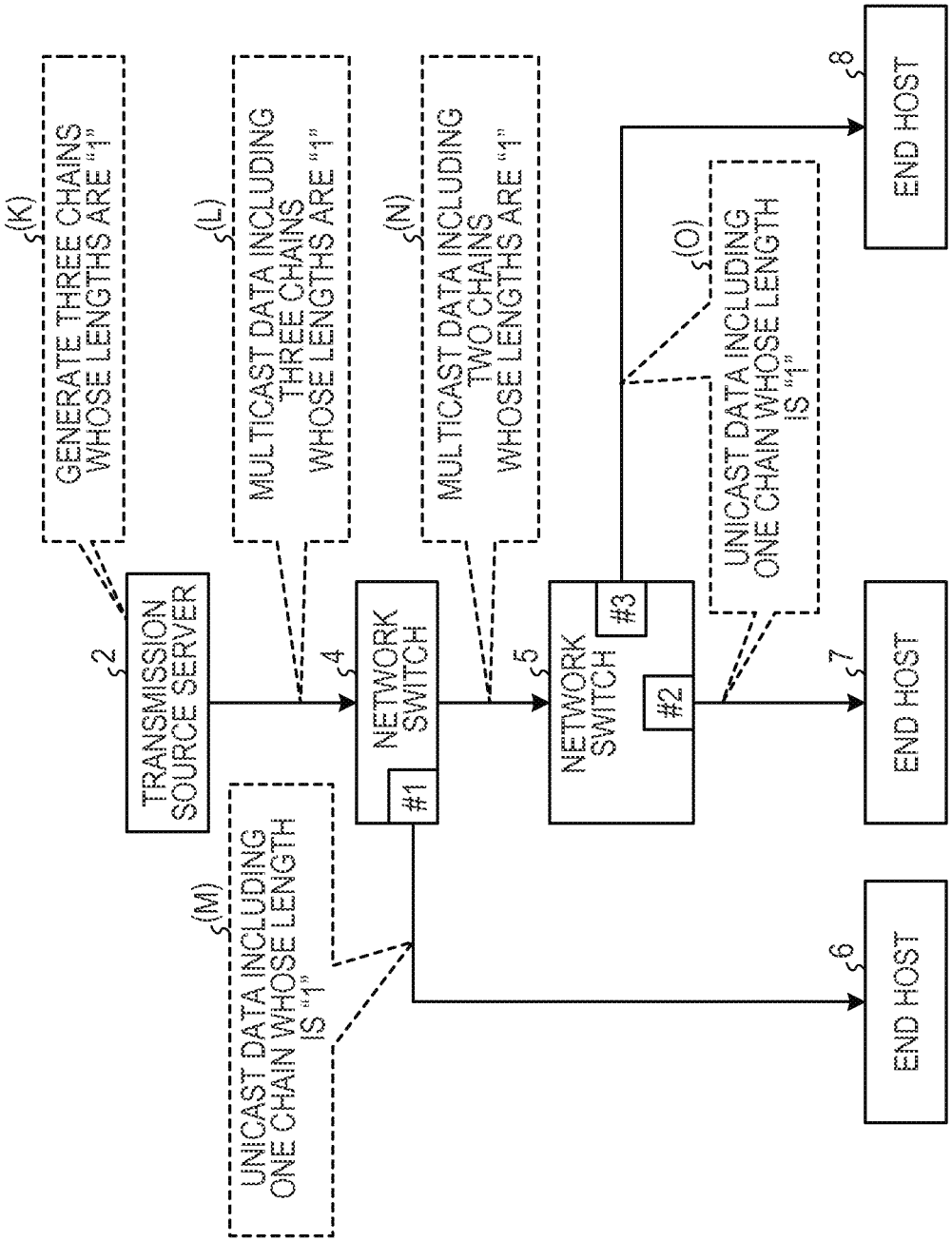
FIG. 12 is a diagram illustrating an example of an operational procedure in which a network switch changes a chain, according to an embodiment.

FIG. 12 is a diagram illustrating an example of an operational procedure in which a network switch changes a chain, according to an embodiment. For example, when transferring data to the end hosts 6 to 8, a transmission source server of the related art generates one chain that sequentially tracks the end hosts 6 to 8 and whose length is "3", assigns the generated chain to the data, and transmits the data. On the other hand, as illustrated in (K) of FIG. 12, the transmission source server 2 does not generate a chain whose length is "3", but generates three chains that are each used for only transmitting data to one of the end hosts 6 to 8 and whose lengths are "1".

As illustrated in (L) of FIG. 12, the transmission source server 2 multicasts data having the three chains whose lengths are "1". Next, the network switch 4 generates, from the received data, data including one chain that is used for only transmitting the data to the end host 6 and whose length is "1", and the network switch 4 changes a multicast address to the unicast address of the end host 6. In addition, as illustrated in (M) of FIG. 12, the network switch 4 unicasts, to the end host 6, the data including one chain that is used for only transmitting the data to the end host 6 and whose length is "1".

In addition, as illustrated in (N) of FIG. 12, the network switch 4 transmits, to the network switch 5, data including two chains that are used for only transmitting the data to the end host 7 or the end host 8 and whose lengths are "1". Then, the network switch 5 generates data including one chain that is used for only transmitting the data to the end host 7 and whose length is "1", and the network switch 5 changes the multicast address to the unicast address of the end host 7. In addition, the network switch 5 generates data including one chain that is used for only transmitting the data to the end host 8 and whose length is "1", and the network switch 5 changes the multicast address into the unicast address of the end host 8. In addition, as illustrated in (O) of FIG. 12, the network switch 5 unicasts the data including one chain whose length "1" to each of the end host 7 and end host 8.

In this way, when a chain is included in multicast data, each of the network switches 4 and 5 changes a first chain included in the data, into a second chain used for only transmitting the data to a directly connected end host. In addition, each of the network switches 4 and 5 transmits the data whose chain has been changed, to the directly connected end host. Therefore, when each of the end hosts 6 to 8 executes a program performing data transfer utilizing a chain, the multicast system 1 may also cause each of the end hosts 6 to 8 to be compatible with multicast communication without modifying the program to be executed by each of the end hosts 6 to 8.

Figure 13:
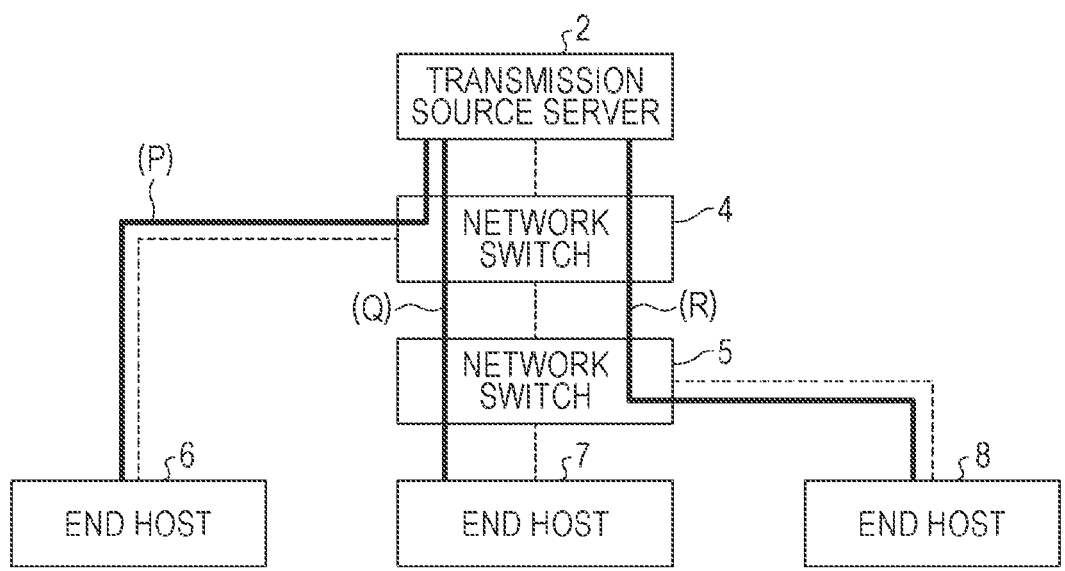
FIG. 13 is a diagram illustrating an example of a transmission control protocol (TCP) path to be established, according to an embodiment.

When a transmission control protocol (TCP) is used as a transfer protocol in order to improve the reliability of data transfer, the transmission source server 2 establishes an independent TCP path with each end host at the time of the execution of the multicast transmission of data. FIG. 13 is a diagram illustrating an example of a transmission control protocol (TCP) path to be established, according to an embodiment. In the example illustrated in FIG. 13, the transmission source server 2 multicasts data whose transmission destinations are the end hosts 6 to 8.

However, the end hosts 6 to 8 each receive, as a unicast data, data multicast by the transmission source server 2. Therefore, as illustrated in (P) to (R) of FIG. 13, an independent TCP path is established between the transmission source server 2 and each of the end hosts 6 to 8. In addition, each of the end hosts 6 to 8 transmits a response to the transmission source server 2 through the independent TCP path.

Here, the transmission source server 2 receives the responses of data from the individual end hosts 6 to 8 through the individually independent TCP paths, and the transmission source server 2 performs retransmission of the data when no response is received before a predetermined time elapses after multicasting the data. In other words, the transmission source server 2 unicasts data through a TCP path established with an end host from which no response has been received.

When implementing such multicast transmission utilizing the TCP, it is unnecessary to modify programs to be executed by the end hosts 6 to 8, but it is necessary to perform extension of a program and an operating system (OS) kernel which are executed by the transmission source server 2. Hereinafter, with reference to FIG. 14 to FIG. 18, the operations of the expanded program and the expanded OS kernel executed by the transmission source server 2 will be described.

Figure 14:
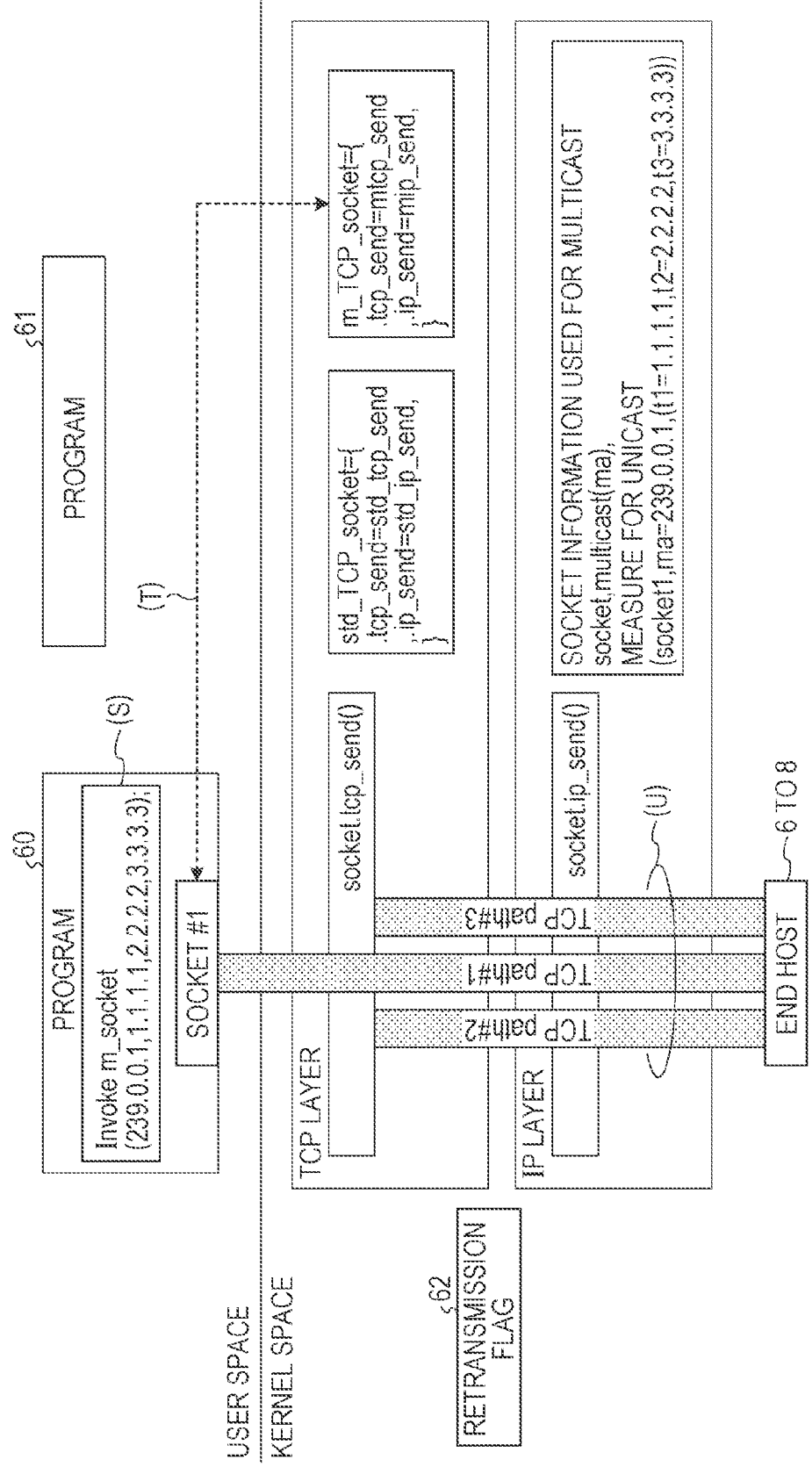
FIG. 14 is a diagram illustrating an example of processing where a program and a kernel, executed by a transmission source server, establish a TCP path, according to an embodiment.

First, with reference to FIG. 14, processing will be described where the transmission source server 2 establishes TCP paths with the individual end hosts 6 to 8. FIG. 14 is a diagram illustrating an example of processing where a program and a kernel, executed by a transmission source server, establish a TCP path, according to an embodiment. In the example illustrated in FIG. 14, a relationship between a user space in which a program operates and a kernel space in which each kernel operates, in the transmission source server 2, is illustrated. In FIG. 14, an application program interface (API) operating in a TCP layer level in the kernel space and an API operating in an IP layer level are described.

For example, the transmission source server 2 executes a program 60 multicasting data and a program 61 unicasting data, in the user space, and includes a retransmission flag 62 for data retransmission, in the kernel space. In addition, the transmission source server 2 includes "std_TCP_socket" and "m_TCP_socket" as APIs operating in the TCP layer within the kernel space.

Here, the "std_TCP_socket" is one of TCP/TP processing function groups included in an OS kernel of the related art, and a function group associated with a socket used for performing usual unicast transmission. In detail, the "std_TCP_socket" includes "std_tcp_send" as "tcp_send" and includes "std_ip_send" as "ip_send".

On the other hand, the "m_TCP_socket" is one of processing function groups expanded for the transmission source server 2 to perform multicast transmission, and, for example, a function group associated with a socket used for multicast transmission where the socket is generated when "m_socket( )" is executed. In detail, the "m_TCP_socket" includes, as the "tcp_send", "mtcp_send" used for multicast transmission, and includes, as the "ip_send", "mip_send" used for multicast transmission.

In addition, the transmission source server 2 stores, in the IP layer, socket information used for multicast. Here, the socket information used for multicast is socket information held so as to perform multicast transmission. In detail, the socket information for multicast includes information that stores, for each socket used for multicast and generated by the program 60 in the user space, the unicast addresses of the individual end hosts 6 to 8 serving as transmission destinations, in association with a multicast address.

For example, in order to multicast data to the individual end hosts 6 to 8, the transmission source server 2 executing the program 60 generates a communication socket #1 using a multicast address, "239.0.0.1" whose transmission destinations are the individual end hosts 6 to 8. For example, as illustrated in (S) of FIG. 14, the transmission source server 2 executes (invokes) "m_soket (239.0.0.1,1.1.1.1,2.2.2.2, 3.3.3.3);" specifying the multicast address and the unicast addresses of the individual end hosts 6 to 8.

Then, as illustrated in (T) in FIG. 14, the socket #1 is generated, and the "m_TCP_socket" is associated with the generated socket #1. In addition, "socket.tcp_send( )" is executed in the TCP layer, and "socket.ip_send( )" is executed in the IP layer by the "socket.tcp_send( )".

In addition, multicast socket information, "socket, multicast(ma)", is held in the IP layer, and "(socket1, ma=239.0.0.1,(t1=1.1.1.1,t2=2.2.2.2,t3=3.3.3.3))" is held as a measure for unicast used for retransmission. Here, "t1" indicates the unicast address of the end host 6 where a TCP path #1 has been established, and "t2" indicates the unicast address of the end host 7 where a TCP path #2 has been established. In addition, "t3" indicates the unicast address of the end host 8 where a TCP path #3 has been established.

As illustrated in (U) of FIG. 14, the TCP path #1 used for transmitting data to the end host 6, the TCP path #2 used for transmitting data to the end host 7, and the TCP path #3 used for transmitting data to the end host 8 are established.

Figure 15:
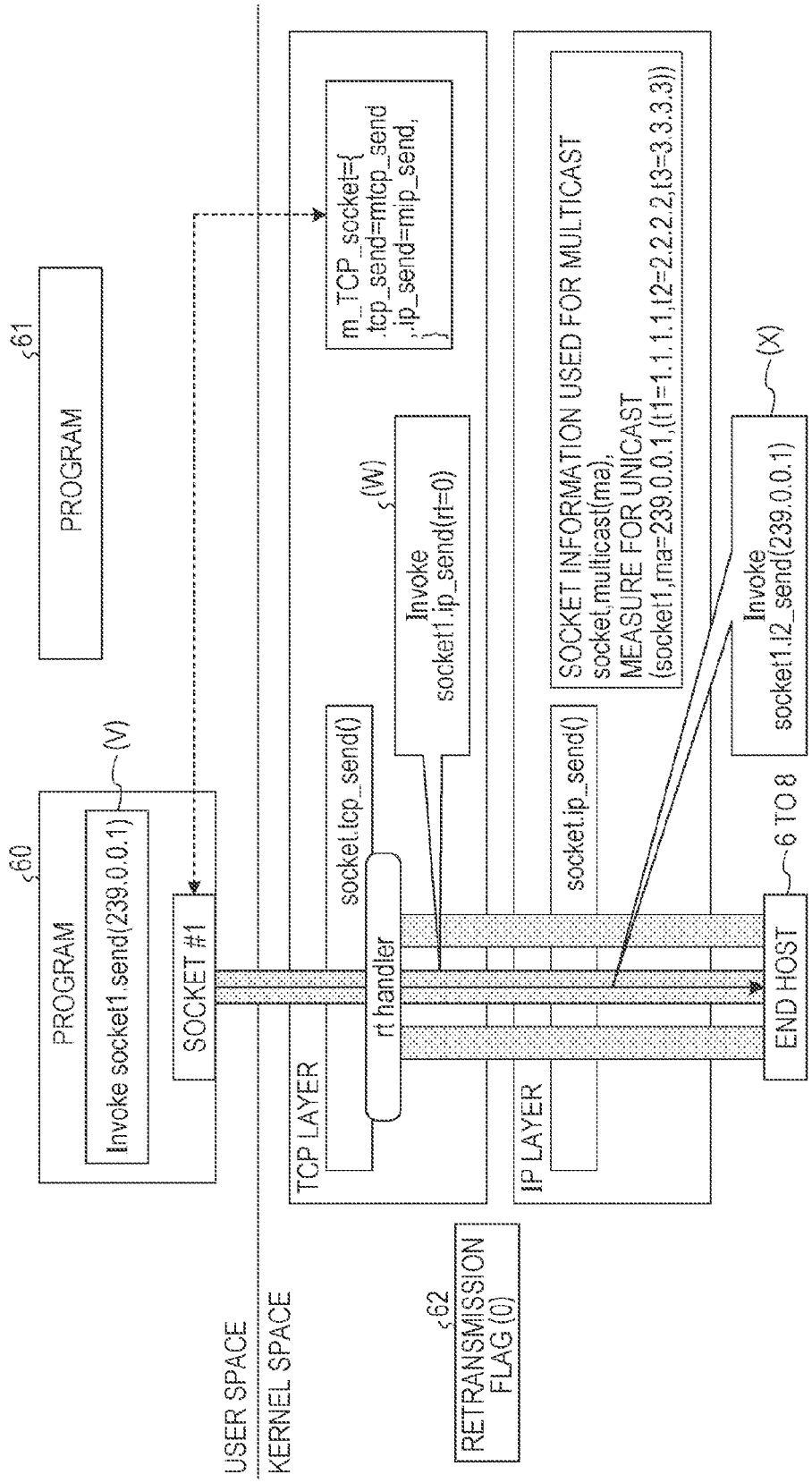
FIG. 15 is a diagram illustrating an example of processing where a program and a kernel, executed by a transmission source server, transmit data, according to an embodiment.

Next, with reference to FIG. 15, the flow of processing that is executed by the transmission source server 2 at the time of multicasting data will be described. FIG. 15 is a diagram illustrating an example of processing where a program and a kernel, executed by a transmission source server, transmit data, according to an embodiment. In FIG. 15, in the same way as in FIG. 14, a relationship between a user space in which a program operates and a kernel space in which each kernel operates, in the transmission source server 2, is illustrated.

For example, as illustrated in (V) of FIG. 15, the program 60 executes (invokes) "socket1.send (239.0.0.1)" in order to multicast data. Then, data serving as a transmission target is delivered from the socket #1 to the "socket.tcp_send ( )" in the TCP layer. Next, in a TCPU layer, "rt handler" is executed that executes the retransmission processing of data, and as illustrated in (W) of FIG. 15, the "socket.tcp_send ( )" executes (invokes) "socket1.ip_send(rt=0)". Then, the data serving as a transmission target is output from the TCPU layer to the IP layer. Here, when "socket.ip_send" is executed for the first time, the retransmission flag 62 is set at "0".

Then, "socket_ip_send ( )" determines whether or not the retransmission flag 62 is "0". When it is determined that the retransmission flag 62 is "0", the "socket_ip_send ( )" multicasts the data output from the TCP layer. Specifically, as illustrated in (X) of FIG. 15, the "socket_ip_send ( )" executes (invoke) "socket1.I2_send(239.0.0.1)", and output data to which the multicast address "239.0.0.1" is assigned. On the other hand, when it is determined that the retransmission flag 62 is "1", the "socket_ip_send ( )" performs the retransmission of data using a unicast address.

Figure 16:
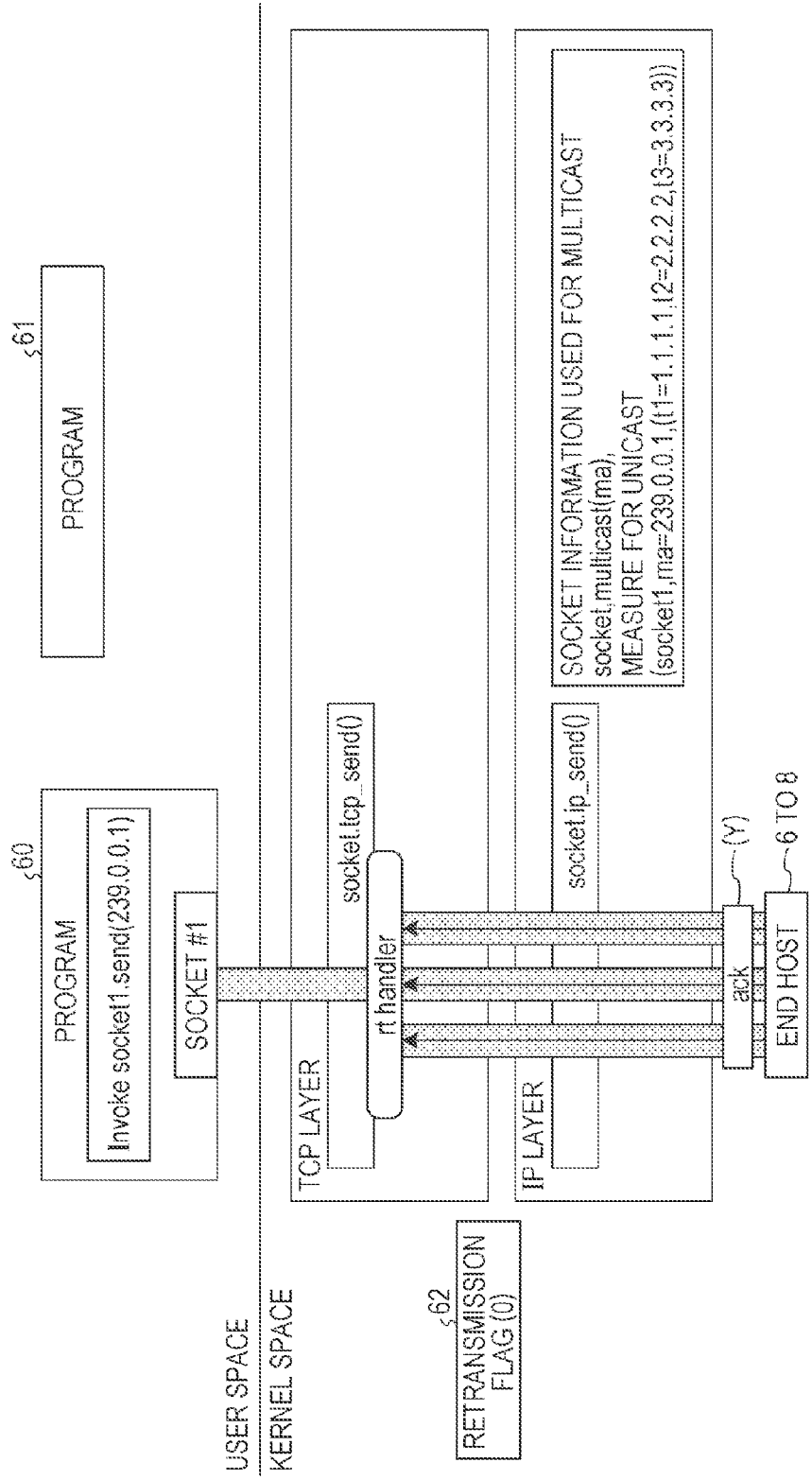
FIG. 16 is a diagram illustrating an example of processing where a program and a kernel, executed by a transmission source server, receive an ack, according to an embodiment.

Hereinafter, with reference to FIGS. 16 and 17, a program executed by the transmit server 2 and processing executed by a kernel, at the time of the retransmission of data, will be described. First, with reference to FIG. 16, the flow of processing will be described that is executed by a program and a kernel when the transmission source server 2 has received an ack. FIG. 16 is a diagram illustrating an example of processing where a program and a kernel, executed by a transmission source server, receive an ack, according to an embodiment. In FIG. 16, in the same way as in FIG. 14, a relationship between a user space in which the program 60 operates and a kernel space in which each kernel operates, in the transmission source server 2, is illustrated.

For example, as illustrated in (V) of FIG. 15, the program 60 executes (invokes) the "socket1.send (239.0.0.1)" in order to multicast data. In this case, TCP paths have been established with the individual end hosts 6 to 8. Here, each of the end hosts 6 to 8 receives multicast data as unicasted data. In addition, as illustrated in (Y) of FIG. 16, the individual end hosts 6 to 8 transmit "ack" serving as responses to the received data through the individual TCP paths established with the transmission source server 2.

Upon receiving the "ack" from all the end hosts 6 to 8 serving as transmission destinations before a predetermined time elapses after transmitting the data, the "rt handler" in the TCP layer determines that the multicast transmission has normally finished. When it is determined that the multicast transmission has normally finished, the transmission source server 2 may notify the multicast management server 3 of the fact that the multicast transmission has finished, in order to release the use of the multicast address "239.0.0.1".

Figure 17:
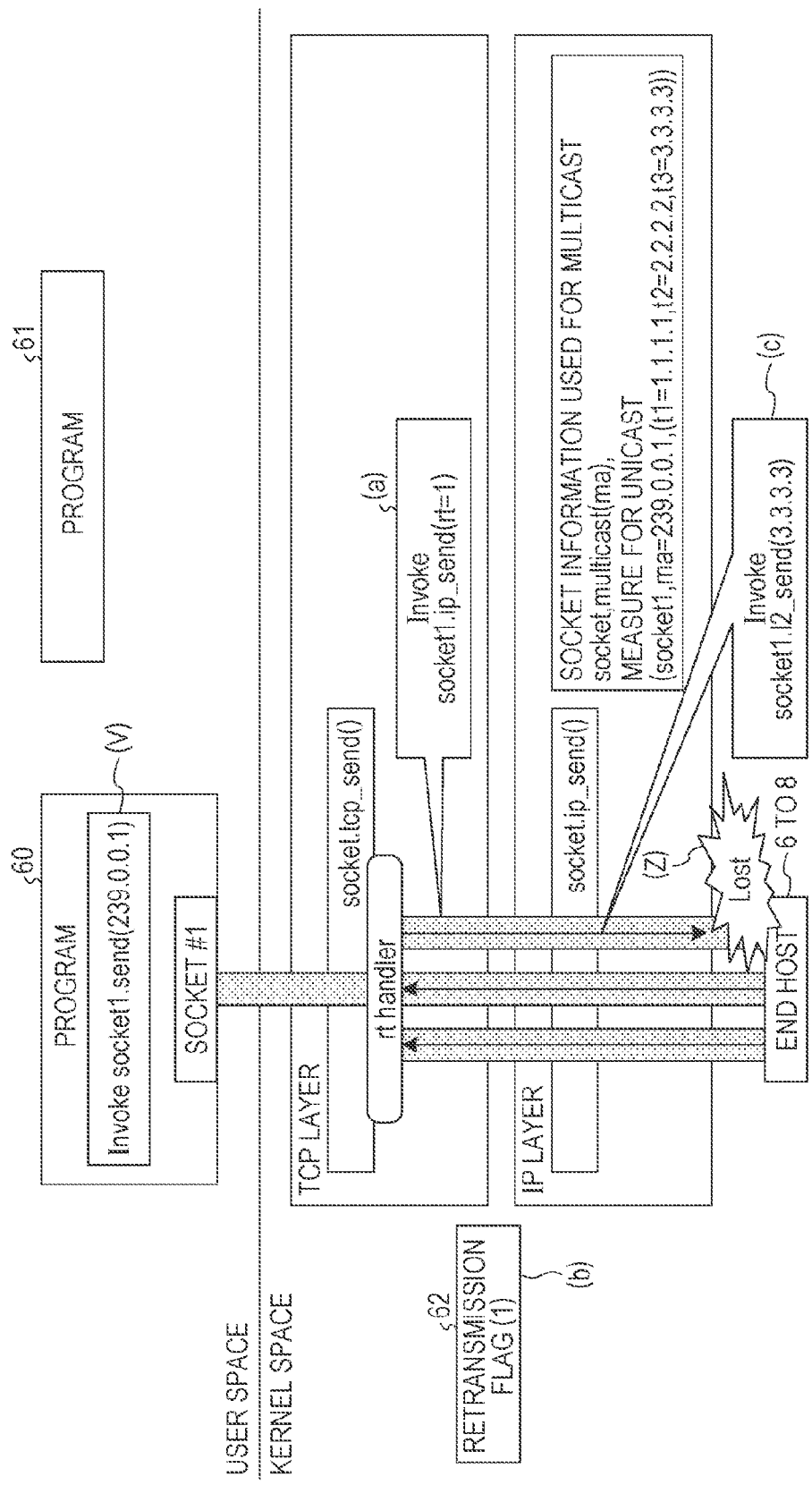
FIG. 17 is a diagram illustrating an example of retransmission processing for data, according to an embodiment.

On the other hand, FIG. 17 is a diagram illustrating an example of retransmission processing for data, according to an embodiment. In FIG. 17, in the same way as in FIG. 14, a relationship between a user space in which a program operates and a kernel space in which each kernel operates, in the transmission source server 2, is illustrated. For example, as illustrated in (Z) of FIG. 17, it is assumed that the "ack" transmitted through the TCP path #3 is lost owing to some kind of failure. In such a case, since not having received the "ack" from the TCP path #3 before a predetermined time elapses after transmitting the data, the "rt handler" in the TCP layer executes (invokes) "socket1.ip_send(rt=1)", as illustrated in (a) of FIG. 17. Then, as illustrated in (b) of FIG. 17, the retransmission flag 62 is set at "1".

The "socket.ip_send ( )" executed by the "rt handler" determines that the retransmission flag 62 is set at "1", and performs the retransmission of data using a unicast address. In detail, the "socket.ip_send ( )" identifies the TCP path #3 through which "ack" has not been returned, and, from the socket information used for multicast, determines that the unicast address "t3" of an end host where the TCP path #3 has been established is "3.3.3.3". In addition, by executing (invoking) "socket1.l2_send(3.3.3.3)", the "socket.ip_send( )" performs the retransmission of data using a unicast address.

Figure 18:
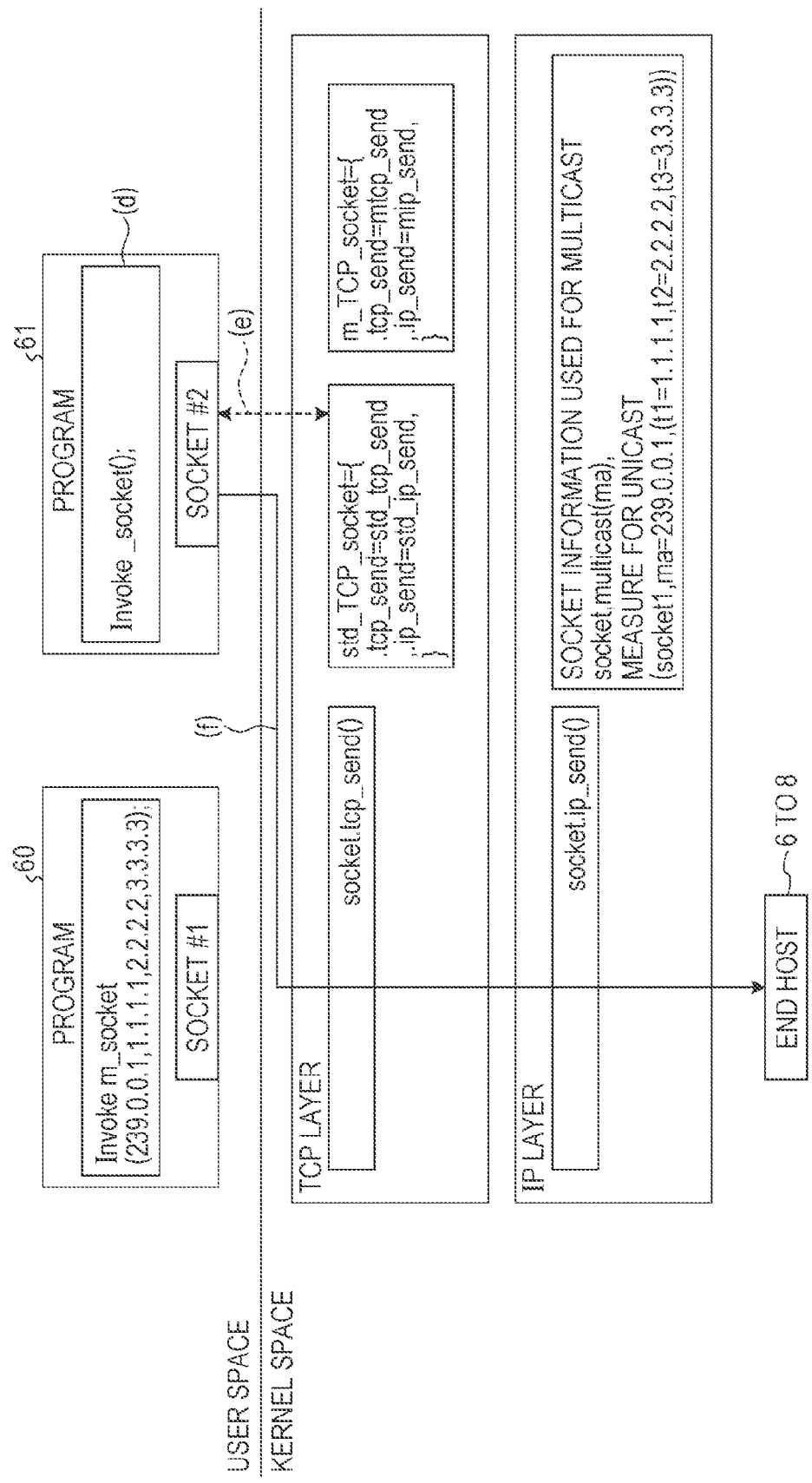
FIG. 18 is a diagram illustrating an example of usual transmission processing executed by a program and a kernel of a transmission source server, according to an embodiment.

Next, with reference to FIG. 18, description will be given of processing that is executed by a program and a kernel at the time of data transmission utilizing a unicast address. FIG. 18 is a diagram illustrating an example of usual transmission processing executed by a program and a kernel of a transmission source server, according to an embodiment. For example, as illustrated in (d) of FIG. 18, the program 61 executes (invokes) "socket ( )" used for unicasting. Then, as illustrated in (e) of FIG. 18, the "std_TCP_socket" is associated with the socket #2 used by the program 61 to transmit data. After that, as illustrated in (f) of FIG. 18, the unicast transmission of data is performed through the socket #2.

Figure 19:
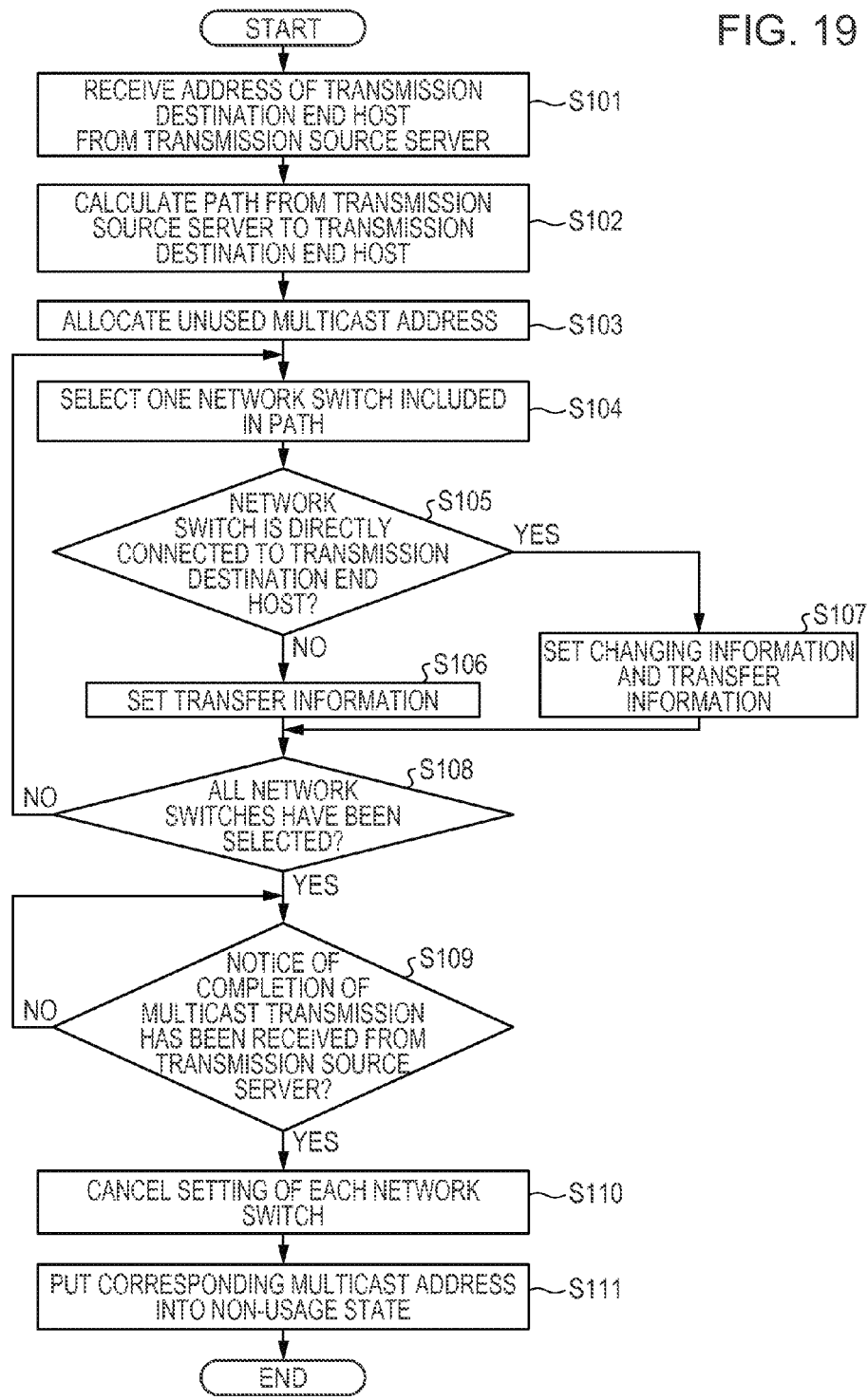
FIG. 19 is a diagram illustrating an example of an operational flowchart performed by a multicast management server, according to an embodiment.

Next, with reference to FIG. 19, the flow of processing executed by the multicast management server 3 will be described. FIG. 19 is a diagram illustrating an example of an operational flowchart performed by a multicast management server, according to an embodiment. For example, the multicast management server 3 receives, from the transmission source server 2, the unicast address of an end host serving as a transmission destination (step S101). Then, the multicast management server 3 calculates the transfer path of data, which leads from the transmission source server 2 to the end host serving as the transmission destination of data (step S102). Next, the multicast management server 3 allocates an unused multicast address (step S103).

Next, the multicast management server 3 selects one network switch included in the path (step S104), and determines whether or not the selected network switch is directly connected to the transmission destination end host (step S105). When the selected network switch is not directly connected to the transmission destination end host (No in step S105), the multicast management server 3 sets transfer information in the selected network switch (step S106). On the other hand, when the selected network switch is directly connected to the transmission destination end host (Yes in step S105), the multicast management server 3 sets changing information and transfer information (step S107).

Next, the multicast management server 3 determines whether or not all network switches included in the calculated path have been selected (step S108), and when all the network switches included in the calculated path have not been selected (No in step S108), the multicast management server 3 executes the step S104. On the other hand, when all the network switches included in the calculated path have been selected (Yes in step S108), the multicast management server 3 determines whether or not the notice of completion of multicast transmission has been received from the transmission source server 2 (step S109).

When the notice of completion of multicast transmission has not been received from the transmission source server 2, the multicast management server 3 waits until the fact of the completion of multicast transmission is received (step S109: negative). On the other hand, when the notice of completion of multicast transmission has been received from the transmission source server 2 (Yes in step S109), the multicast management server 3 cancels the setting of each network switch (step S110). In other words, the multicast management server 3 deletes, from each network switch, the changing information and the transfer information, which relate to the completed multicast transmission. Then, the multicast management server 3 puts the multicast address relating to the completed multicast transmission, into a non-usage state (step S111), and terminates the processing.

Figure 20:
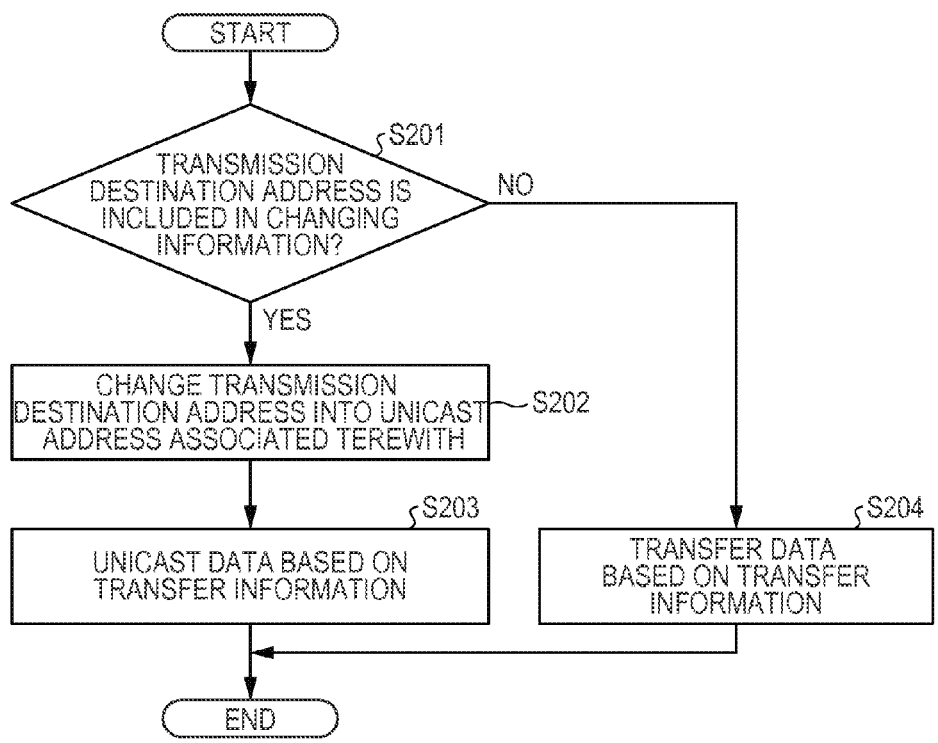
FIG. 20 is a diagram illustrating an example of an operational flowchart performed by a network switch, according to an embodiment.

Next, with reference to FIG. 20, the flow of processing executed by the network switch 4 will be described. FIG. 20 is a diagram illustrating an example of an operational flowchart performed by a network switch, according to an embodiment. The network switch 4 performs, upon receiving data from the transmission source server 2, processing illustrated in FIG. 20. First, the network switch 4 determines whether or not the transmission destination address of the received data is included in changing information (step S201).

When the transmission destination address of the received data is included in the changing information (Yes in step S201), the network switch 4 changes the transmission destination address of the data into a unicast address associated by the changing information (step S202). Next, on the basis of the transfer information, the network switch 4 unicasts the data whose transmission destination address has been changed to the unicast address (step S203), and terminates the processing. On the other hand, when the transmission destination address of the received data is not included in the changing information (No in step S201), the network switch 4 executes transfer processing based on the transfer information (step S204), and terminates the processing.

[Advantageous Effect of Storage System 1]

As described above, the network switch 4 stores therein changing information in which a multicast address and the unicast address of the end host 6 directly connected to the network switch 4 are associated with each other. The network switch 4 determines whether or not the network switch 4 has stored therein changing information including a multicast address assigned to the received data. When the network switch 4 having stored therein the changing information including the multicast address assigned to the received data, the network switch 4 changes the multicast address assigned to the received data, into a unicast address associated by the changing information.

After that, the network switch 4 transmits, to the end host 6, the data in which the multicast address has been changed into the unicast address. Therefore, the multicast system 1 may cause the end host 6 to perform multicast communication without modifying a program executed by the end host 6.

When a chain is included in data to be transferred, the network switch 4 changes the chain included in the data to be transferred, into a chain used for only transferring the data to the end host 6 directly connected to the network switch 4. Therefore, when the end host 6 executes a program for transferring data using a chain, the network switch 4 may also cause the end host 6 to perform multicast communication without modifying the program executed by the end host 6.

Upon receiving, from the transmission source server 2, a notice of end hosts serving as the transmission destinations of data, the multicast management server 3 notifies the transmission source server 2 of an unused multicast address. In addition, from among network switches transferring data from the transmission source server 2 to the end hosts serving as the transmission destinations of data, the multicast management server 3 specifies a network switch directly connected to an end host serving as the transmission destination of data. In addition, the multicast management server 3 performs the setting of a network switch so that the network switch transfers data after the multicast address notified to the transmission source server 2 has been changed into the unicast address of the directly connected end host.

For example, the multicast management server 3 sets the network switch 4 so that the network switch 4 transmits data to the end host 6 after the multicast address has been changed into the unicast address of the end host 6. Therefore, the multicast management server 3 may cause the end hosts 6 to 8 to perform multicast communication without modifying programs executed by the end hosts 6 to 8. In addition, since the multicast management server 3 notifies the transmission source server 2 of an unused multicast address, it is possible to dynamically allocate a multicast address.

In addition, from among ports of the specified network switch, the multicast management server 3 identifies a port to which the end host serving as the transmission destination of data is directly connected. In addition, the multicast management server 3 sets the specified network switch so that the data whose multicast address has been changed into a unicast address is output from the identified port. Therefore, the multicast management server 3 eliminates the need for the individual network switches 4 and 5 to determine a port from which the data is to be output so as to transmit, to the end hosts 6 to 8, pieces of data whose multicast address has been changed into the unicast addresses. As a result, the multicast management server 3 may cause the individual end hosts 6 to 8 to perform multicast communication, without greatly modifying the individual network switches 4 and 5.

The multicast management server 3 identifies a network switch for transferring data, by using topology information indicating a connection relationship between the individual network switches 4 and 5 and the individual end hosts 6 to 8. Then, from among identified network switches, the multicast management server 3 specifies a network switch directly connected to the end host serving as a transmission destination of data. Therefore, the multicast management server 3 may correctly specify the network switch directly connected to the end host serving as a transmission destination of data.

When performing the multicast transmission of data, the transmission source server 2 assigns a multicast address to the data. Then, the transmission source server 2 outputs the data to which the multicast address is assigned, to the network switch 4 that transmits the data after having changed the multicast address into the unicast address of the directly connected end host 6. Therefore, the transmission source server 2 may cause the end host 6 serving as the transmission destination, to perform multicast communication without modifying the program executed by the end host 6.

When no response has been received from an end host serving as the transmission destination of data, the transmission source server 2 assigns, to the data, the unicast address of the end host from which no response has been received, and retransmits the data. Therefore, when it has been difficult for the end hosts 6 to 8 to receive data owing to some kind of failure, the transmission source server 2 may perform the retransmission of data without modifying the programs executed by the end hosts 6 to 8.

[Second Embodiment]

Embodiments may also be implemented in various different forms in addition to the above-mentioned embodiment. Therefore, hereinafter, as a second embodiment, another embodiment included in the present technology will be described.

(1) End Host

In the above-mentioned multicast system 1, an example has been described where the transmission source server 2 transmits data to the individual end hosts 6 to 8. However, embodiments are not limited to this. In other words, each of the end hosts 6 to 8 may also have the function of the transmission source server 2, and may also multicast data to another end host or the transmission source server 2 operating as an end host.

In addition, for each piece of data, a group of end hosts serving as transmission destinations of data, namely, targets of multicast transmission, may be selected by a program executed by the transmission source server 2. In addition, it is unnecessary for the transmission source server 2 to release the usage state of a multicast address every time multicast transmission has finished, and, for example, the transmission source server 2 may also continue transmitting data to the same group of end hosts using the same multicast address, during a predetermined time period.

(2) Transfer Information

The above-mentioned network switch 4 transfers data using transfer information. Here, the transfer information may also be information utilizing a so-called FDB or MAC table. In addition, the multicast management server 3 and the network switch 4 may also cause the FDB or MAC table to secure the function of the transfer information. For example, by adding, to the FDB in the network switch 4, an entry that associates at least a multicast address and a sending port with each other, the multicast management server 3 may also perform the setting of the transfer information.

In addition to the transfer information notified of by the multicast management server 3, the network switch 4 may also store, in the transfer information storage unit 41, a MAC table and so forth obtained using a learning function so as to use the MAC table and so forth. In the storage system 1, a multicast address is a dynamically assigned address. Therefore, even if a multicast address is included in the FDB or MAC table learned by the network switch 4, the multicast address may be deleted in accordance with a deletion request transmitted from the multicast management server 3.

(3) Multicast System 1

In the above-mentioned multicast system 1, an example has been described that includes the three end hosts 6 to 8 and the network switches 4 and 5, so as to facilitate understanding. However, embodiments are not limited to this. For example, not only a configuration where the network switches 4 and 5 are connected in a stepwise fashion, but a connection configuration such as a fabric may also be applied to the multicast system 1. In addition, it is unnecessary for the multicast system 1 to multicast data to all the end hosts 6 to 8, and the multicast system 1 may multicast data only to, for example, the end hosts 6 and 8.

In this way, the multicast system 1 may dynamically allocate a multicast address independently of the connection configuration of the network switches 4 and 5 and the end hosts 6 to 8. The multicast system 1 may cause the end hosts 6 to 8 to perform multicast communication without modifying the programs executed by the end hosts 6 to 8, independently of the connection configuration of the network switches 4 and 5 and the end hosts 6 to 8.

(4) Program

Various kinds of processing operations described in the above-mentioned embodiment may be realized by executing preliminarily prepared programs on a computer such as a personal computer or a workstation. Hereinafter, with reference to FIG. 21, description will be given of an example of a computer that executes a proximity determination program having the same function as the above-mentioned embodiment.

Figure 21:
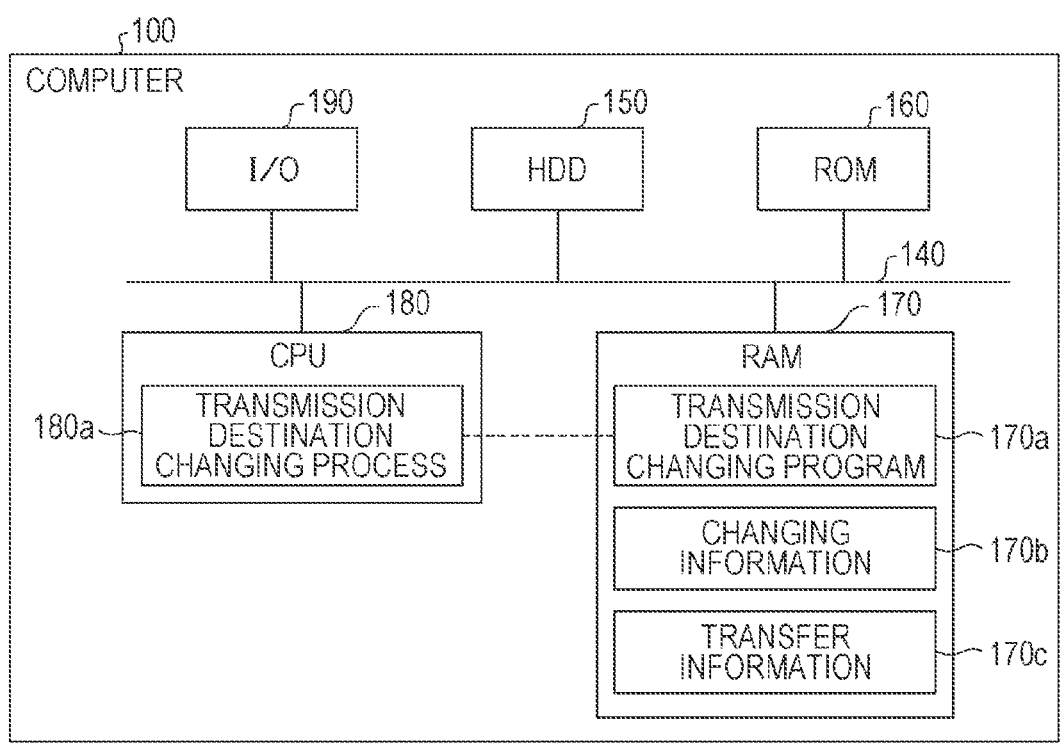
FIG. 21 is a diagram illustrating an example of a computer for executing a transmission destination changing program, according to an embodiment.

FIG. 21 is a diagram illustrating an example of a computer for executing a transmission destination changing program, according to an embodiment. As illustrated in FIG. 21, a computer 100 includes a hard disk drive (HDD) 150, a read only memory (ROM) 160, a random access memory (RAM) 170, a central processing unit (CPU) 180, and an input/output (I/O) 190. These individual units 150 to 190 are connected through a bus 140.

In the RAM 170, a transmission destination changing program 170*a*, changing information 170*b*, and transfer information 170*c* that fulfill the same function as the network switch 4 are preliminarily stored. The transmission destination changing program 170*a* may be arbitrarily integrated or separated in the same way as each configuration element illustrated in the first embodiment.

The CPU 180 reads, deploys, and executes the transmission destination changing program 170*a*, and hence, the transmission destination changing program 170*a* functions as a transmission destination changing process 180*a*. The transmission destination changing process 180*a* executes various kinds of processing operations on the basis of the changing information 170*b* and the transfer information 170*c*, read from the RAM 170.

The transmission destination changing process 180*a* includes processing executed by the table control unit 46, the communication control unit 47, the determination unit 48, the address changing unit 49, and the identifying unit 50. As for the individual processing units virtually realized on the CPU 180, it is unnecessary for all the processing units to operate on the CPU 180 on a continuous basis, and only a processing unit desired for the processing may be virtually realized.

It is unnecessary to store the above-mentioned transmission destination changing program 170*a* in the RAM 170 from the beginning. For example, the individual programs may be stored in a "portable physical medium" such as a flexible disk, a so-called flexible disk (FD), a Compact Disk (CD)-ROM, a digital video disk (DVD), a magnet-optical disk, or an IC card, which is inserted into the computer 100.

The computer 100 may also acquire the individual programs from the portable physical medium and execute the acquired programs. The individual programs may also be stored in another computer, a server device, or the like, connected to the computer 100, through a public line, Internet, a LAN, a wide area network (WAN), or the like. In this case, the computer 100 may also acquire the individual programs from these and execute the acquired individual programs.

In addition to the transmission destination changing program 170*a*, the computer illustrated in FIG. 21 may execute, for example, a transmission program having the same function as the transmission source server 2, a setting program having the same function as the multicast management server 3, and so forth. For example, the CPU 180 reads and deploys the transmission program and the setting program, held in the RAM 170, executes a transmission process and a setting process, thereby realizing the same functions as the transmission source server 2 and the multicast management server 3.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having stored therein a program for causing a computer included in a multicast system to execute a setting procedure, the multicast system being configured to multicast data from a transmission source device to a plurality of transmission destination devices via one or more transfer devices, the setting procedure comprising:

providing the computer with network topology information that stores a unicast address used when data is unicast to each of the plurality of transmission destination devices, and port-identification information identifying a port of a transfer device via which the transfer device is directly connected to another device;

upon receiving a notice indicating that there exists the plurality of transmission destination devices from the transmission source device serving as a transmission source of first data, notifying the transmission source device of a multicast address used for multicasting the first data to the plurality of transmission destination devices;

based on the network topology information, specifying a first transfer device directly connected to at least one of the plurality of transmission destination devices, from among the one or more transfer devices that transfer the first data from the transmission source device to the plurality of transmission destination devices;

generating, based on the network topology information, changing information that stores the multicast address, the port-identification information identifying a port to which a transmission destination device is directly connected, and the unicast address of the transmission destination device, in association with each other; and setting the first transfer device, by transmitting the generated changing information to the first transfer device, so that the first transfer device generates second data by changing, based on the changing information, the multicast address assigned to the first data into the unicast address of the transmission destination device associated with the first transfer device, and the first transfer device transfers the second data to the transmission destination device directly connected to the first transfer device via a port identified by the port-identification information associated with the transmission destination device.

2. A setting device included in a multicast system being configured to multicast data from a transmission source device to a plurality of transmission destination devices via one or more transfer devices, the setting device comprising:

a memory configured to store network topology information that stores a unicast address used when data is unicast to each of the plurality of transmission destination devices, and port-identification information identifying a port of a transfer device via which the transfer device is directly connected to another device; and one or more processors coupled to the memory, the one or more processors being configured to:

notify, upon receiving a notice indicating that there exists the plurality of transmission destination devices from the transmission source device serving as a transmission source of first data, the transmission source device of a multicast address used for multicasting the first data to the plurality of transmission destination devices, specify, coupled to the memory, the one or more processors being, a first transfer device directly connected to at least one of the plurality of transmission destination devices, from among the one or more transfer devices that transfer the first data from the transmission source device to the plurality of transmission destination devices, generate, based on the network topology information, changing information that stores the multicast address, the port-identification information identifying a port to which a transmission destination device is directly connected, and the unicast address of the transmission destination device, in association with each other, and set the first transfer device, by transmitting the generated changing information to the first transfer device, so that the first transfer device generates second data by changing, based on the changing information, the multicast address assigned to the first data into the unicast address of the transmission destination device associated with the first transfer device, and the first transfer device transfers the second data to the transmission destination device directly connected to the first transfer device via a port identified by the port-identification information associated with the transmission device.

3. A setting method for performing a setting of a transfer device included in a multicast system being configured to multicast data from a transmission source device to a plurality of transmission destination devices via one or more transfer devices, the setting method comprising:

providing the computer with network topology information that stores a unicast address used when data is unicast to each of the plurality of transmission destination devices, and port-identification information identifying a port of a transfer device via which the transfer device is directly connected to another device;

upon receiving a notice indicating that there exists the plurality of transmission destination devices from the transmission source device serving as a transmission source of first data, notifying the transmission source device of a multicast address used for multicasting the first data to the plurality of transmission destination devices;

based on the network topology information, specifying a first transfer device directly connected to at least one of the plurality of transmission destination devices, from among the one or more transfer devices that transfer the first data from the transmission source device to the plurality of transmission destination devices;

generating, based on the network topology information, changing information that stores the multicast address, the port-identification information identifying a port to which a transmission destination device is directly connected, and the unicast address of the transmission destination device, in association with each other; and setting the first transfer device, by transmitting the generated changing information to the first transfer device, so that the first transfer device generates second data by changing, based on the changing information, the multicast address assigned to the first data into the unicast address of the transmission destination device associated with the first transfer device, and the first transfer device transfers the second data to the transmission destination device directly connected to the first transfer device via a port identified by the port-identification information associated with the transmission destination device.

* * * * *